US007191400B1

(12) United States Patent
Buvac et al.

(10) Patent No.: US 7,191,400 B1
(45) Date of Patent: Mar. 13, 2007

(54) METHODS FOR GENERATING AND VIEWING HYPERLINKED PAGES

(75) Inventors: Sasa Buvac, Woolgoolga (AU); Jeaneah Paik, Woolgoolga (AU)

(73) Assignee: Stanford University, Palo Alto, CA (US)

( * ) Notice: Subject to any disclaimer, the term of this patent is extended or adjusted under 35 U.S.C. 154(b) by 851 days.

(21) Appl. No.: 09/776,171

(22) Filed: Feb. 2, 2001

Related U.S. Application Data

(60) Provisional application No. 60/180,022, filed on Feb. 3, 2000.

(51) Int. Cl.
*G06F 15/00* (2006.01)
(52) U.S. Cl. .................................. 715/530; 715/501.1
(58) Field of Classification Search ............. 715/501.1, 715/513, 530, 500
See application file for complete search history.

(56) References Cited

U.S. PATENT DOCUMENTS

| | | | | |
|---|---|---|---|---|
| 5,634,062 A | | 5/1997 | Shimizu et al. ............. | 395/762 |
| 5,708,825 A | | 1/1998 | Sotomayor .................. | 395/762 |
| 5,724,595 A | | 3/1998 | Gentner ...................... | 395/762 |
| 5,784,058 A | * | 7/1998 | LaStrange et al. .......... | 345/738 |
| 5,809,317 A | | 9/1998 | Kogan et al. ............... | 395/762 |
| 5,911,776 A | * | 6/1999 | Guck .......................... | 709/217 |
| 5,933,140 A | * | 8/1999 | Strahorn et al. ............ | 345/712 |
| 5,933,142 A | * | 8/1999 | LaStrange et al. .......... | 345/788 |
| 5,956,736 A | | 9/1999 | Hanson et al. .............. | 707/513 |
| 5,991,773 A | * | 11/1999 | Tagawa ...................... | 707/203 |
| 5,991,782 A | * | 11/1999 | Miyagawa et al. ......... | 715/513 |
| 6,016,494 A | | 1/2000 | Isensee et al. .............. | 707/102 |
| 6,018,748 A | | 1/2000 | Smith ......................... | 707/501 |
| 6,067,560 A | * | 5/2000 | Potts, Jr. ..................... | 709/203 |
| 6,069,630 A | | 5/2000 | Lisle et al. .................. | 345/357 |
| 6,122,647 A | * | 9/2000 | Horowitz et al. ........... | 715/513 |
| 6,138,129 A | * | 10/2000 | Combs ......................... | 707/6 |
| 6,230,168 B1 | * | 5/2001 | Unger et al. ............. | 715/501.1 |
| 6,230,173 B1 | * | 5/2001 | Ferrel et al. ................ | 715/513 |
| 6,230,196 B1 | * | 5/2001 | Guenthner et al. ......... | 709/223 |
| 6,233,591 B1 | * | 5/2001 | Sherman et al. ......... | 715/501.1 |
| 6,256,631 B1 | * | 7/2001 | Malcolm ..................... | 707/10 |
| 6,262,732 B1 | * | 7/2001 | Coleman et al. ............ | 715/835 |

(Continued)

OTHER PUBLICATIONS

Allan, Automatic Hypertext Link Typing, ACM 1996, pp. 42-52.*

(Continued)

*Primary Examiner*—Cong-Lac Huynh

(57) ABSTRACT

A method, known as bud, automatically generates hyperlinks and new hyperlinked pages to form a tree of linked pages from a single parent page. User-selected text is cut from the parent page and inserted into a newly-created child context (e.g., file). The cut text is replaced in the parent page by an expandable hyperlink to the child page, and a back-link to the parent page is inserted into the child page. The file of the new page is preferably named by a function of the timestamp of its creation. Also provided is a method, view4edit, by which a file is presented to a user for viewing and editing in response to the user's selection of a hyperlink to the file. The user views the file in a buffer named by linked text associated with the selected hyperlink. When the methods are combined, a user can view a newly created context without knowing its filename, which was generated during budding.

2 Claims, 30 Drawing Sheets

U.S. PATENT DOCUMENTS

| | | |
|---|---|---|
| 6,338,059 B1* | 1/2002 | Fields et al. .................... 707/4 |
| 6,509,912 B1* | 1/2003 | Moran et al. ................ 715/762 |
| 6,529,910 B1* | 3/2003 | Fleskes ........................ 707/10 |
| 6,572,660 B1* | 6/2003 | Okamoto ................. 715/500.1 |
| 6,583,799 B1* | 6/2003 | Manolis et al. ............. 715/838 |
| 6,622,139 B1* | 9/2003 | Nakayama et al. ............. 707/3 |
| 6,763,496 B1* | 7/2004 | Hennings et al. ......... 715/501.1 |
| 6,816,870 B1* | 11/2004 | Nishimura et al. ...... 707/104.1 |
| 6,826,727 B1* | 11/2004 | Mohr et al. ................. 715/517 |
| 6,907,565 B1* | 6/2005 | Huang ........................ 715/513 |
| 7,024,623 B2* | 4/2006 | Higashiyama et al. ...... 715/530 |
| 7,127,674 B1* | 10/2006 | Carroll et al. .............. 715/530 |
| 2001/0034629 A1* | 10/2001 | Cronin .......................... 705/7 |
| 2001/0049698 A1* | 12/2001 | Hsu et al. ................ 707/501.1 |
| 2002/0059334 A1* | 5/2002 | Jelbert ....................... 707/500 |
| 2002/0066782 A1* | 6/2002 | Swaminathan et al. ..... 235/375 |
| 2002/0069219 A1* | 6/2002 | Weng ...................... 707/501.1 |
| 2002/0078102 A1* | 6/2002 | Dutta .......................... 707/526 |
| 2002/0131625 A1* | 9/2002 | Vining et al. ................ 382/128 |
| 2002/0152234 A1* | 10/2002 | Estrada et al. ........... 707/501.1 |
| 2002/0156800 A1* | 10/2002 | Ong ........................... 707/203 |
| 2002/0158901 A1* | 10/2002 | Mezei ........................ 345/744 |
| 2004/0205488 A1* | 10/2004 | Fry ........................ 715/501.1 |
| 2004/0215664 A1* | 10/2004 | Hennings et al. ........ 707/104.1 |
| 2005/0108626 A1* | 5/2005 | Ong ........................... 715/511 |
| 2005/0135662 A1* | 6/2005 | Vining et al. ............... 382/128 |

OTHER PUBLICATIONS

Davison, Topical Locality in the Web, ACM 2000, pp. 272-279.*

Microsoft Corporation, Microsoft Word 2000, screenshots, pp. 1-3.*

* cited by examiner

This is a page shown in a buffer named, ``parent''.

`--:**-Emacs   parent         12:53am   (Text Fill)--L23--Bot---`

*Fig. 4A*

This is a parent page shown in a buffer named, ``parent''.

markedtextmarkedtextmarkedtextmarkedtextmarkedtextmarkedtext
markedtextmarkedtextmarkedtextmarkedtextmarkedtextmarkedtext `--:**-Emacs   parent         12:55am   (Text Fill)--L26--Bot----`

```
This is a parent page shown in a buffer named, ``parent''.

linked text▮
```

```
--:**-Emacs   parent        12:57am   (Text Fill)--L26--Bot--
M-x view4edit
```

*Fig. 4G*

```
: markedtextmarkedtextmarkedtextmarkedtextmarkedtextmarkedtext
markedtextmarkedtextmarkedtextmarkedtextmarkedtextmarkedtext▮
```

```
--:**-Emacs   linked text   12:58am   (Text Fill)--L24--All--
```

*Fig. 4H*

■ markedtextmarkedtextmarkedtextmarkedtextmarkedtextmarkedtext
markedtextmarkedtextmarkedtextmarkedtextmarkedtextmarkedtext `--:**-Emacs   linked text    12:59am    (Text Fill)--L23--All--`
M-x view4edit

*Fig. 4I*

■linked text

`--:**-Emacs   parent    1:00am    (Text Fill)--L26--Bot-----`

The figures exemplify the following two processes: ←—a

Bud generates links and linked pages. ←—b
View4Edit follows links, and renames linked pages after linked text.

c↗

```
--:**-Emacs  parent       8:58pm   (Text Fill)--L25--All----------
M-x bud  ←—command in minibuffer
```

*Fig. 5C*

$P_1^2$ ($P_1$ revised by budding)    $BT_1^2$ ($BT_1$ revised by budding)

The figures exemplify the following two processes: ←—a

▄←——$L_1$
View4Edit follows links, and renames linked pages after linked text.

c↗

```
--:**-Emacs  parent       8:59pm   (Text Fill)--L25--Bot----------
```

*Fig. 5D*

$P_1^7$ ($P_1^6$ with added linked text $LT_3^2$)

$BT_1^7$ ($BT_1^6$ with change in linked text $LT_3^1$ to $LT_3^2$)

$P_1^7$ $BT_1^7$

M-x View4Edit ◄——— command in minibuffer

METHODS FOR GENERATING AND VIEWING HYPERLINKED PAGES

CROSS-REFERENCE TO RELATED APPLICATIONS

This application claims the benefit of U.S. Provisional Application No. 60/180,022 filed Feb. 3, 2000, which is herein incorporated by reference.

FIELD OF THE INVENTION

This invention relates generally to hyperlinked documents stored in a computer system. More particularly, it relates to a method for automatically generating and naming hyperlinked documents.

BACKGROUND ART

The explosive proliferation of the World Wide Web (the Web) has created a niche of writing called web authoring, which consists of creating content, hyperlinking it to other (perhaps already hyperlinked) material, and publishing the results on the Web as web pages. A web page is a data-filled object that is interconnected to other web pages by means of one or more hyperlinks. A hyperlink (or link) is a mechanism for getting from a source to a destination or target in a collection, i.e., a web, of web pages.

Creating and hyperlinking content occur during the private generation of a personal web, which is then made publicly available on the Web. The process is complete when viewers engage the Web through a browser and serve as an audience to what has been authored. Information on the Web can be accessed by any computer with the right hardware (e.g., a way to connect itself to the Web by ethernet, modem, etc.) and the right software (e.g., a browser). A browser presents web pages to an end user, enabling him or her to follow or navigate links to move from one location to another by clicking on hotspots (described below).

Data on the Web is typically embedded with machine code called Hypertext Markup Language (HTML), which appears as tags marking the content elements of a web page. These tags are interpreted by a browser as indications of how to render the final output of a web page for viewing purposes. The tags themselves, once interpreted by a browser, are invisible to the viewer.

Perhaps the most important HTML tag is the anchor tag, <a>, which designates the presence of a hyperlink. A link can be thought of as a connector with two endpoints: a beginning (the source) and a destination (the target). The source of the link is also referred to as a hotspot, an active place within a web page that can be clicked by a user in a browser to lead to another web page. Hotspots are usually marked by evocative text called "linked text" or an image intimating the destination of the link. Hotspots are created by using the <a> tag and including a valid Uniform Resource Locator (URL) as an HREF attribute. For example, the following HTML code defines a hotspot marked by the linked text, "example link," which, when clicked on in a browser, will lead to the top of the HTML document located at "some.URL.html".

<a HREF="http://some.URL.html">example link</a>

Note the syntactic elements such as:

<a> and </a>, which denote the onset and completion of an anchor, respectively;

the HREF attribute, which must be included within the initiating <a> tag;

the value of the HREF attribute, which is a URL enclosed in quotation marks; and the placement of linked text in the space between the onset <a> and ending </a> tag.

This HTML syntax poses overhead to a novice user wanting to author web pages. For this reason, WYSIWYG (What You See is What You Get) HTML editors have been developed, such as Netscape's Composer, Macromedia's Dreamweaver, and Adobe's GoLive. The WYSIWYG interface automates link creation by offering a make link (or similarly named) command that can be accessed by selecting a visual icon or an option from a pull-down menu. This selection opens a corresponding pop-up dialog box or property window with editable fields that prompts a user to input the required link information, after which the link is created. In these systems, the user needs to know only the substantial components of a desired link, i.e., the linked text and target URL, but does not need to know the syntax of HTML.

For example, to create a hotspot using Netscape's Composer, a user clicks a link icon that appears as a linked chain. Doing so immediately triggers a dialog box that prompts the user to input the linked text, HREF URL, and any other desired HTML tags. The user can instead select a choose-file button within the dialog box to prompt presentation of a menu display of files. Selection of one of the presented files eliminates the need for typing in the HREF value by hand.

Macromedia Dreamweaver has a similar functionality that allows an author also to create a link to a new file, i.e., one not already in existence. This option presents a dialog box containing fields for the name of the new document and the linked text that will act as the hotspot in the selected document. This feature is very much like Composer's link dialog box, except that it allows an author to create and name a new file to which the previously selected file will link.

Dreamweaver offers several other WYSIWYG methods for creating a link between documents, none of which differ significantly from those of Composer, except possibly the point-to-file method. An area of text in a document can be selected to act as the hotspot for a nascent link. From this point, a variety of linking tools are available for the author to select the file to which the hotspot will point. The make-link command opens a select-file box that displays a menu of existing files from which the author can select. The link field in the property inspector window takes the pathname of a linked-to file. This pathname can be indicated by the author by: a) typing the pathname in by hand; b) clicking the folder icon, which presents a menu display of files that can be selected; or c) clicking a point-to-file icon that allows the author to drag an extendable line to any file on the desktop or to a separate window, named Site, that contains all of the items to be included in the web.

Adobe GoLive also allows an author to mark an area of text in a document and call a link function by clicking an icon pictured as a linked chain. A link inspector window, which is similar to Composer's link dialog box, is opened to reveal a field in which the author can input a URL to which a nascent link will point. The link inspector has an additional feature of a point-and-shoot icon, similar to Dreamweaver's point-to-file icon, that can be used to select target files. The author clicks the point-and-shoot icon and then drags an extendable line to select any file icon on the desktop. GoLive also features a site window showing all files in the web. The point-and-shoot mechanism can be used to select items directly from the site window, which is accessible in the region just outside the link inspector. The user is exhorted to place all items to be included in the website in the site window before beginning any web authoring.

The different WYSIWYG editors attempt to automate link generation by providing a variety of simple methods by which an author can select a target file without being familiar with HTML. In most cases, however, all files must be created before a link can be generated. In the one case described above in which a file is created at the time of link generation, the author must select the file name of the new file and later add content to the file.

A variety of different methods for implementing link generation are found in the patent literature. For example, U.S. Pat. No. 5,724,595, issued to Gentner, discloses a method for creating a hypertext link in an original document to a target document. When an anchor icon is dragged from a target page to an original page, a link is created and the name of the target page is inserted as the linked text. While this method further streamlines the link automation process by inserting the linked text automatically, it still requires the author to create and name each of the files to be linked.

U.S. Pat. No. 5,708,825, issued to Sotomayer, discloses a method for automatically creating summary pages of documents and embedding hyperlinks in the summary pages and original documents. Content of a source document is semantically analyzed automatically to determine key topics that are then copied into the summary page. Links are created between the topic listing and the associated text, which is copied into a presentation page. This method is useful for creating and organizing a structure of documents to make viewing more efficient and informative. A viewer can navigate through a large amount of material while viewing small, easy to understand portions. However, while the method does allow an author to select analysis parameters, it uses an automatic process for parsing the source document and is therefore only as reliable as the quality of the semantic analysis method. The author cannot control exactly which text is inserted into each file. It also requires that the source document be in a final version before the process is initiated. There is no provision for editing documents after creation. If the author decides to modify text after the files are created, either the process must be repeated or each file must be changed manually by the author.

OBJECTS AND ADVANTAGES

Accordingly, it is a primary object of the present invention to provide a method for automatically generating hyperlinks between pages. In addition to not requiring the author to know HTML, the method does not require the author to know the filenames of the linked pages.

It is a further object of the invention to provide a method for automatically generating, naming, and inserting content in child pages linked to by parent pages.

It is an additional object of the invention to provide a method for providing hyperlinked pages to a user for editing. The user needs only to locate the link to the page, but does not need to know the filename of the page.

It is another object of the present invention to provide a method for version control of a set of edited hyperlinked pages that allows the hyperlink remain the same when new versions of a file are created. There is no need to change the hyperlink to refer to the new file versions.

Finally, it is an object of the invention to provide an intuitive method for building an entire web of pages from a single parent page.

SUMMARY

These objects and advantages are attained by a method, called bud, for the generation of links and linked pages. The method creates a tree structure by "budding" linked pages (children or budz) from within a parent page. Budding is the process whereby a marked region of text is shunted from the parent page into a new page, the bud, and is replaced by an expandable link to the bud. The bud is also typically linked back to its parent. Naming of newly budded budz is made transparent to the user by using timestamps. Upon viewing with a process called view4edit, a bud is dynamically named after its linked text.

In particular, a method for automatically creating linked computer contexts (e.g., files, pages, or windows) is performed by removing user-selected content from a parent context, creating and automatically naming a new context containing the user-selected content, and inserting a reference (e.g., a hyperlink) to the new context in the parent context. Preferably, the new context is named with a uniquely identifying function of a timestamp at which context creation occurred. The hyperlink inserted into the parent context is preferably an expandable link in which the user can insert linked text. The new context also contains a back-reference or back-link, which may be invisible, to the parent context itself or to the location of the original hyperlink in the parent context. The method can be initiated when a user submits a command or drags the selected text onto another entity, such as the desktop, in which case a new icon is created. The method can be repeated on the new context to create a multi-level hierarchy of contexts, or on the parent context to create many new contexts at the same level.

When the user selects a reference and executes a view4edit command, a buffer or other editing means is provided in which the user views and edits the new context. The viewer name is preferably the same as the linked text associated with the selected hyperlink. In some embodiments, a new version of the new context is created and saved when the command is executed, and the buffer provides the new version. All versions of the same context are stored in a single directory, typically named by a uniquely identifying function of the timestamp of creation of the first version. The new version can be a copy of the most recent version in the directory or a user-selected version. Each time the command is executed, the existing linked text can be stored in a history list associated with the hyperlink.

The present invention also provides a method for presenting linked computer contexts for viewing and editing by a user. In this case, the contexts include a parent context and at least one version of a child context, each of which includes a revision of an original child context at different times. The different versions are preferably stored in a single directory. In response to a user command and selection of a reference or hyperlink in the parent context to the child context, a viewer is opened containing contents of a selected version of the child context. The selected version is saved as a new context, preferably named by a uniquely identifying function of the timestamp at which it is saved. The selected version can be a most recent version or a user-selected version.

BRIEF DESCRIPTION OF THE FIGURES

FIGS. 4A–4J show buffer contents at different stages of a simple implementation of the methods of FIGS. 2 and 3.

DETAILED DESCRIPTION

Figure 1:
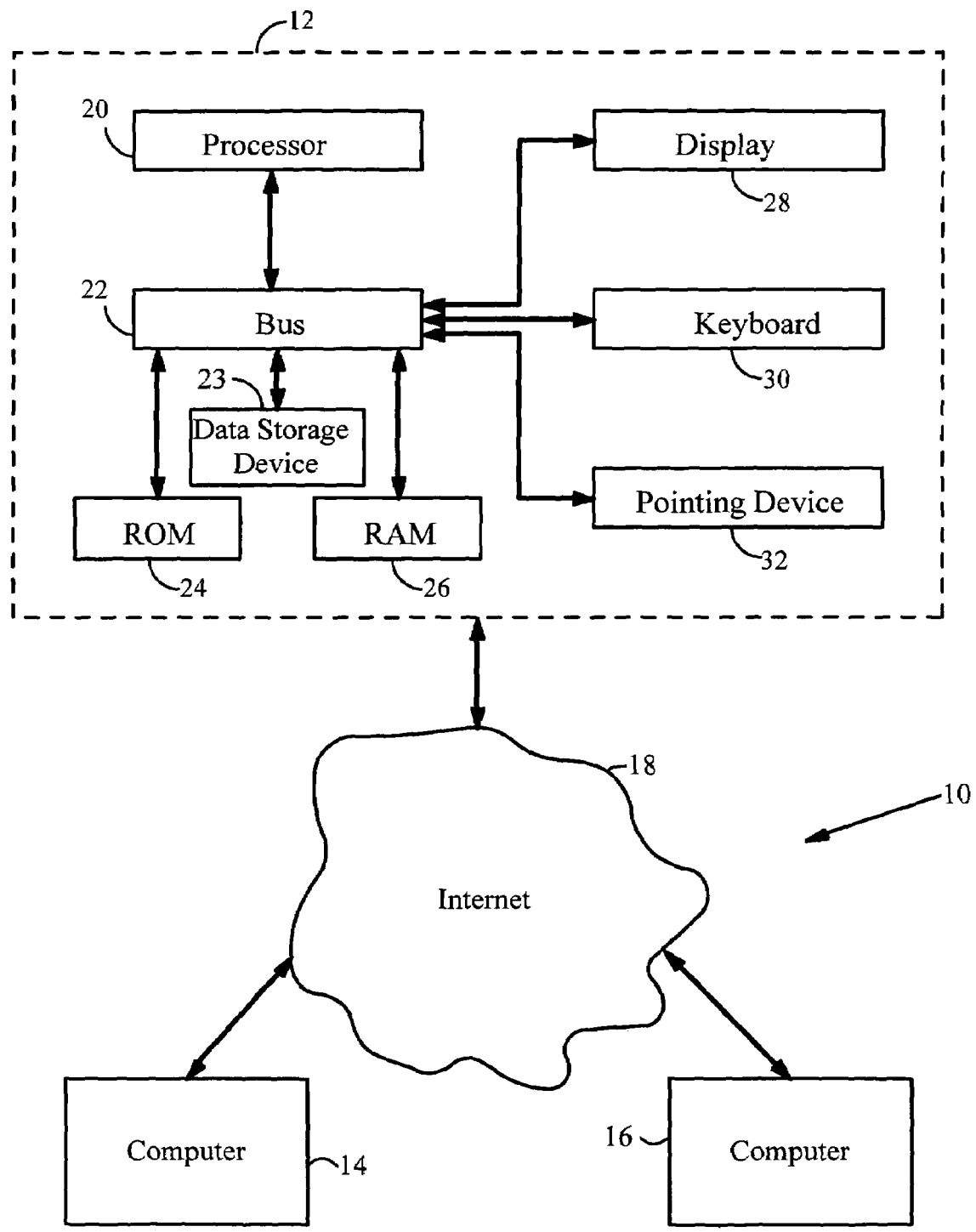
FIG. 1 is a block diagram of a computer system for implementing the present invention.

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention provides a method for automating link generation and linked page creation during web page authoring. It also provides methods for version control and selection of web pages. In contrast to prior art methods, the present invention does not require the author to create and name each component of the private web before generating hyperlinks among the documents. By removing the rigid constraints of most WYSIWYG editors, the present invention frees the author to continuously change and develop the structure of the interlinked documents to more closely mirror the creative authoring process. The author no longer needs to be concerned with the names of content elements.

The following standard computer science terminology is used throughout this description:

A page is similar to a web page on the World Wide Web. It is taken to be the basic unit of information. Formally, it is a sequence of primitive objects (text, pictures, graphics, sound, etc.), each possibly with an associated link.

A body of text refers to the contents displayed by a page.

A link is a relation on a page that relates a specific location in that page to another page. A back-link is a link that points from a bud (i.e., a child page) back to its parent. Text characters that have an associated link are typically underlined and, when selected, will lead to the linked page. A link can be seen as a Uniform Record Locator (URL) or a pointer. Links (or hyperlinks) and back-links are also referred to, most generally, as references and back-references, respectively.

Linked text is a fragment of continuously underlined text, all the characters of which have the same link. Linked text typically describes what is on the linked page.

An expandable link is a link with a dummy null value for linked text (typically a blank underscore) that can be expanded by the user with arbitrary linked text.

A buffer is used by an editor to display a page for the purposes of editing and revision.

A buffer name is the name given to a buffer.

A minibuffer is a thin control strip used to input commands for editing a page in a buffer.

A file is used to permanently store pages when a computer is turned off. The data contained in a file is referred to as the file contents.

A filename is the name given to a particular file for the purposes of storage and retrieval.

A timestamp contains the date and time, typically displayed as month:day:year:hour:minutes:seconds.

Context, as used herein, refers to any computer-based unit for containing data in any format. Context can be interpreted as an abstraction of a computer file, but refers to any type of computer data structure, including, but not limited to, a file, web page, document, window, frame, buffer, or sticky note. It is expected that new data units will be developed in the future, but such units will fall within the scope of the term context. Note that a single unit of context, e.g., a file, is referred to as a context. The data contained within a context is referred to as content, which can include text, graphics, audio, animation, or other media types. For more information on context, see John McCarthy and Sasa Buvac, "Formalizing Context (Expanded Notes)," in A. Aliseda, R. J. van Glabbeek, and D. Westerst, eds., *Computing Natural Language*, vol. 81, CSLI Lecture Notes, pp. 13–50, Center for the Study of Language and Information, Stanford University, 1998, which is herein incorporated by reference. In the description below, a file or page is used as a concrete example of context. However, it is to be understood that this usage is for illustration purposes and in no way limits the scope of the invention.

FIG. 1 is a block diagram of a typical computer system 10 in which the present invention is implemented. While the invention may be implemented within a single computer 12, it is typically implemented within a network environment in which content created on a single computer 12 is subsequently made available to the entire networked community, illustrated as computers 14 and 16. The community may be connected via the Internet 18 or a local intranet accessible to a limited number of computers. Computer 12 includes a processor 20, data bus 22, read only memory (ROM) 24, random access memory (RAM) 26, and a data storage device 23, such as a magnetic or optical disk. The system also includes I/O devices such as a visual display 28, a keyboard 30, and a pointing device 32. The present invention is typically stored as computer instruction code in RAM 26 or ROM 24 for execution by processor 20.

In a preferred embodiment, the invention is implemented with two distinct methods, bud and view4edit. bud is a method for generating links and linked pages from within a page. bud acts on a region of marked text and cuts it, pastes it into a newly created page, and establishes links between the two pages. The originating page is called the parent, and the newly created page the bud, the plural of which is budz. Budz may also be referred to as children of parent pages. In the preferred embodiment, a link pointing back to a parent from within a bud is called a back-link. view4edit is a method that "follows" a link by displaying a linked-to page in a buffer named after the linked text. A simple example of a single round of bud and view4edit is described in Example 1 below.

bud and view4edit can be interwoven in a mutually recursive fashion with revision to create a tree of linked pages. For example, a user can be editing a page and decide to bud a section of the page. The user marks the section and executes bud on it. bud creates a new page (i.e., the bud). Meanwhile, it cuts the marked region from the parent and replaces it with a link pointing to the bud. The previously cut region is inserted into the bud. In the preferred embodiment, a back-link to its parent is inserted along with the cut region. view4edit can be executed on the link in the parent to display the bud for further editing. Executing view4edit on the back-link of the bud displays its parent for editing. During this process of editing, bud can again be executed on the parent to create a link to another bud, this time in a different place than for the first link. A parent can bud multiple budz as desired, and budz can also bud multiple budz. A user can thus selectively bud various regions of text to bud a tree of budz, i.e., a growing tree of linked pages which can be used to articulate and cultivate ideas. A budded tree can further be turned into a web simply by cutting and pasting links. A detailed example of mutually recursive uses of bud and view4edit with multiple revisions to bud a tree is described in Example 2 below.

Figure 2:
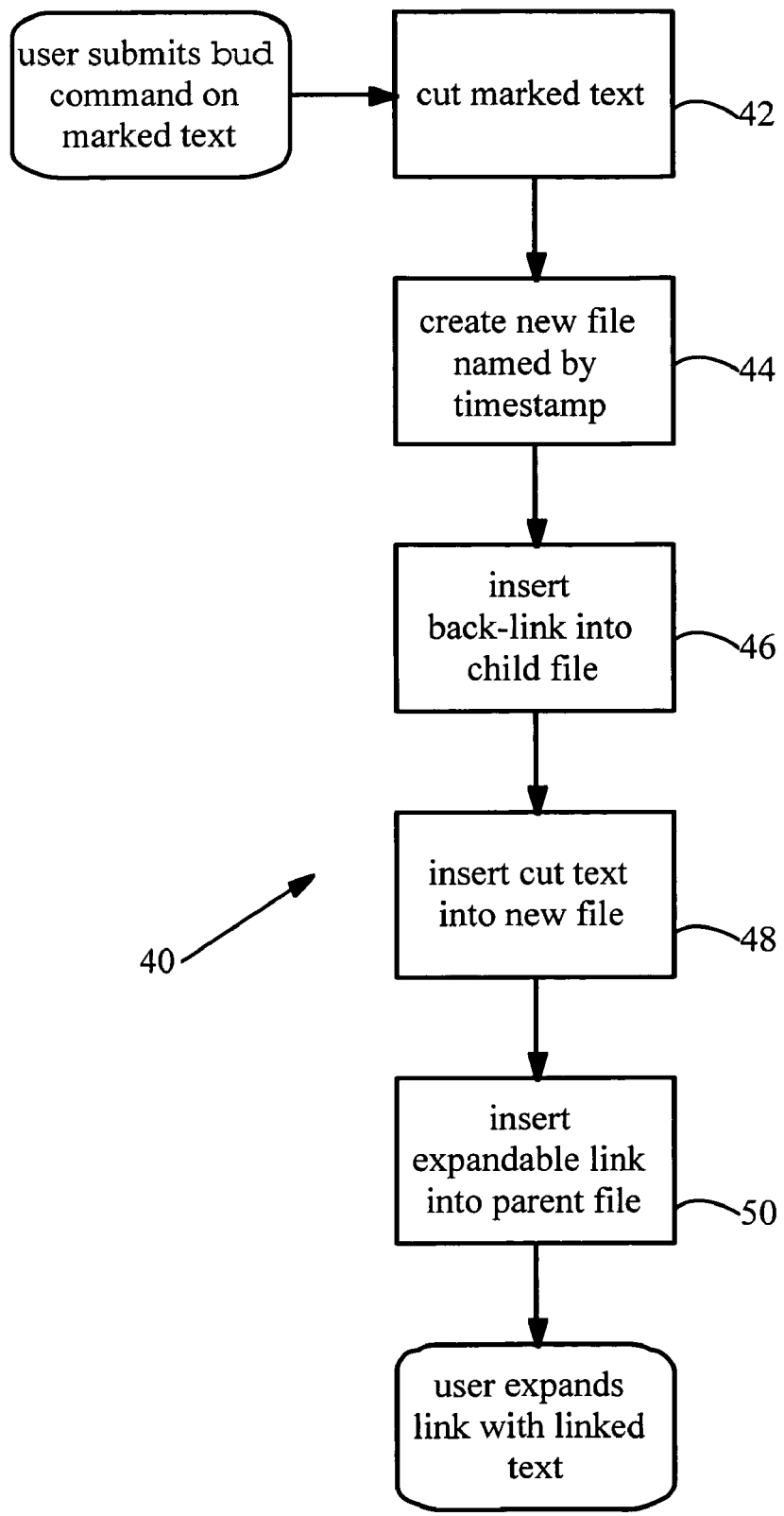
FIG. 2 is a flow diagram of a method of the invention for creating new linked contexts.

FIG. 2 is a flow diagram of steps used by a bud method 40. A user submits the bud command on a continuously marked region of content in a page $P_1$. The marked content can be text or other media such as embedded video or audio files. In step 42, the marked content is cut from $P_1$. A new file $P_2$ is created in step 44 and preferably named by a uniquely identifying function of the timestamp (which may simply be the timestamp) at which the bud command was executed. A back-link to the parent file $P_1$ is inserted into the new file $P_2$ in step 46. For example, the back-link can be an underlined colon, an image, or a standard word or phrase. The previously cut content is inserted in the new file $P_2$ in step 48. Finally, an expandable link pointing to the new file $P_2$ is inserted into the parent file $P_1$ in step 50. The expandable link may appear as a blank underscored region, and the user can enter text into the blank region to expand the link.

As used herein, the phrase "uniquely identifying function" refers to an injective function according to its standard mathematical definition. Considering a function to be a mapping from one set, the domain, to another set, the codomain, an injective function maps different elements of the domain to different elements of the codomain. That is, no two (different) elements of the domain map to the same element of the codomain.

Figure 3:
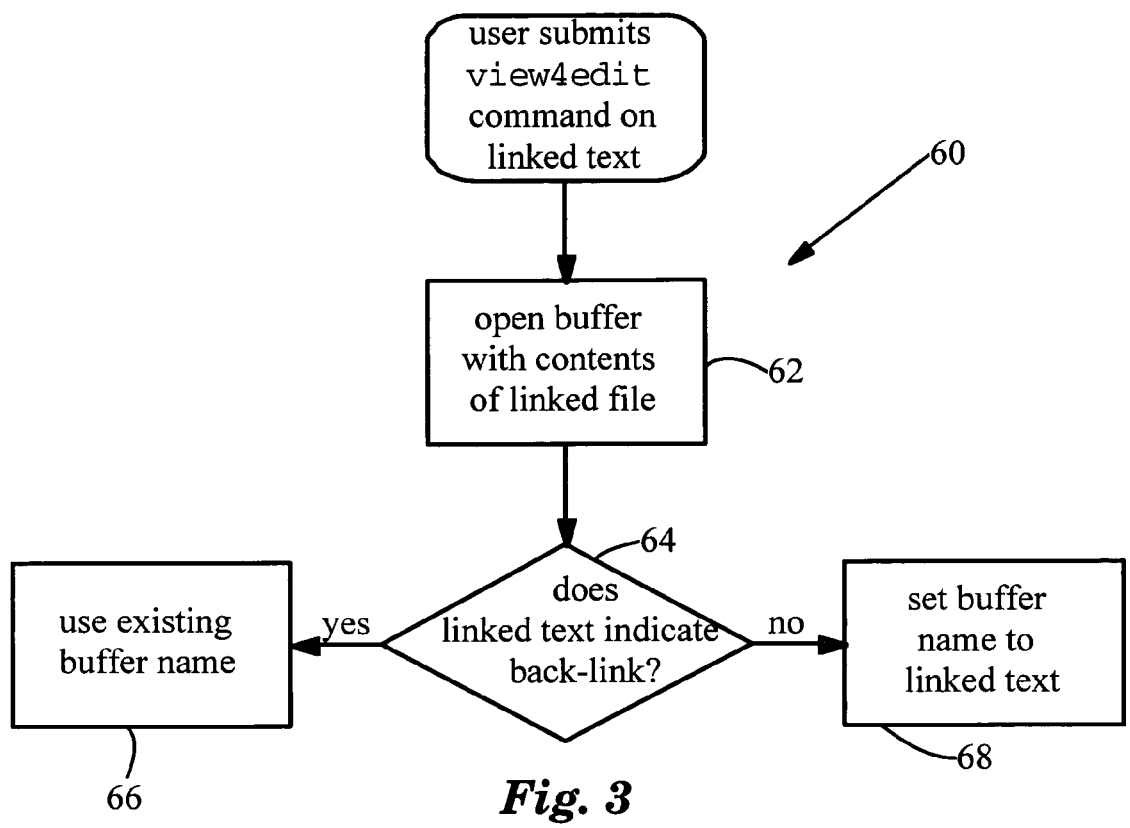
FIG. 3 is a flow diagram of a method of the invention for viewing and editing linked contexts.

FIG. 3 is a flow diagram of steps used by a view4edit method 60. A user selects a hyperlink within the parent page $P_1$ and submits the command to view and edit the linked page. In step 62, a new buffer is opened containing the contents of the file linked to by the user-selected hyperlink. In this case, the viewed content is the content that was inserted into new file $P_2$. In step 64, the type of selected link is determined. If the selected link represents a back-link to a parent file, then the buffer name is not changed (step 66). In all other cases, the linked text associated with the selected hyperlink becomes the buffer name (step 68).

EXAMPLE 1

FIGS. 4A–4J show buffer contents at different stages of the bud and view4edit processes described above. This example demonstrates a simple use of the methods to create a link from an existing page (the parent page) to a new page.

A single round of bud and view4edit is illustrated in which:
  bud is used to create a new linked page, i.e., the bud;
  view4edit is used to view the bud; and
  view4edit is used on the bud's colon back-link to display its unique parent again.

Figures 4C, 4D:
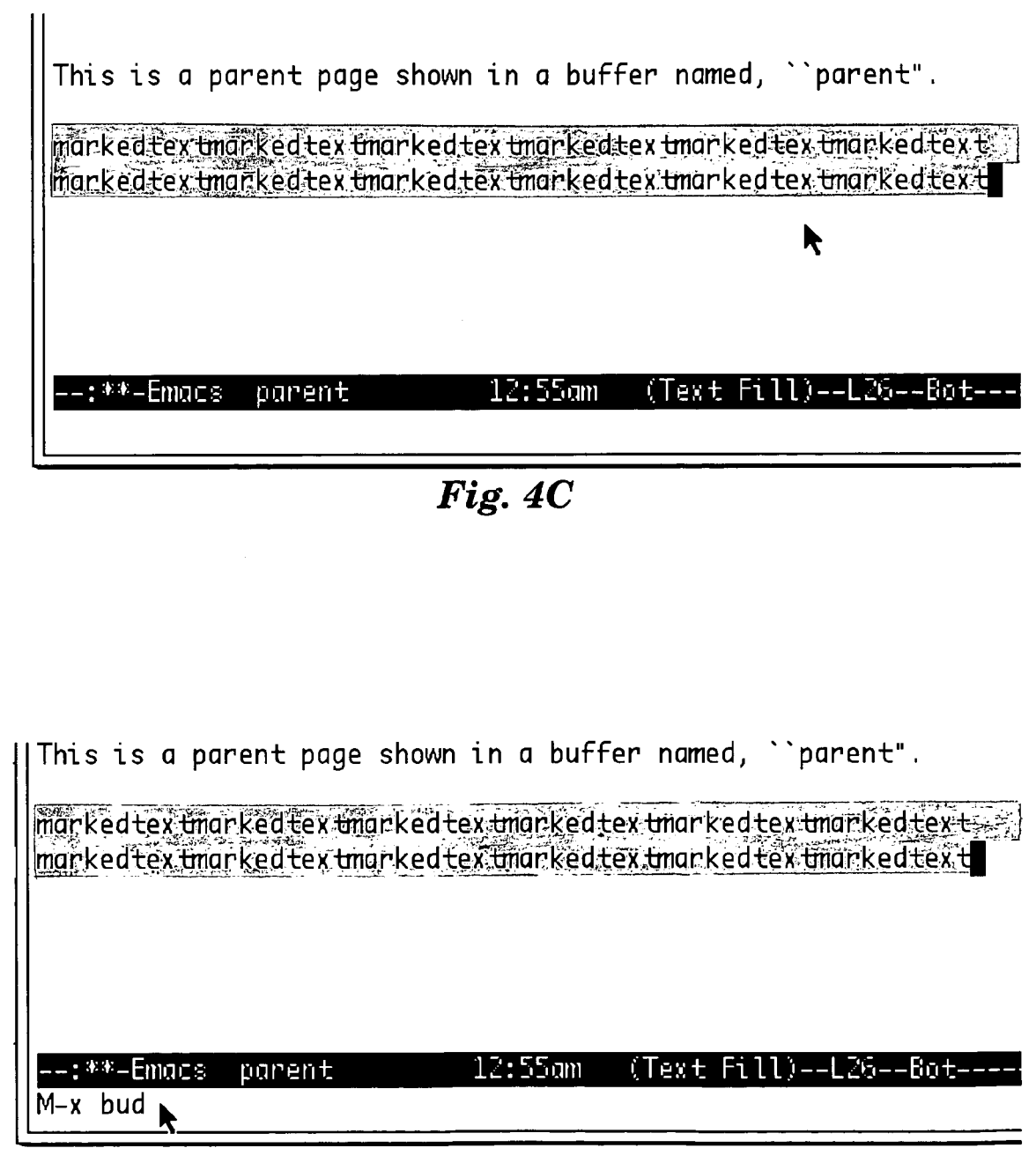

FIG. 4A shows a sentence in a page displayed in a buffer named "parent." The page shown serves as the parent page, which subsequently buds a link to a new page. FIG. 4B illustrates the same parent page with a new region of text ("markedtext . . . markedtext") introduced by the user. This text will be marked and budded from the parent page. FIG. 4C shows the same page with the newly introduced text marked (i.e., highlighted) by the user. FIG. 4D shows the identical page, but with the command M-x bud in the minibuffer of the parent buffer before it is executed. In the particular implementation illustrated, M-x (pronounced meta-x) is a minibuffer command that calls a function. Executing this command on the marked region shunts it from the parent to a new page, i.e., the bud. A new file is opened and named with a timestamp of the time at which the command was executed, and the marked region is pasted into the new timestamped file.

Figure 4E:
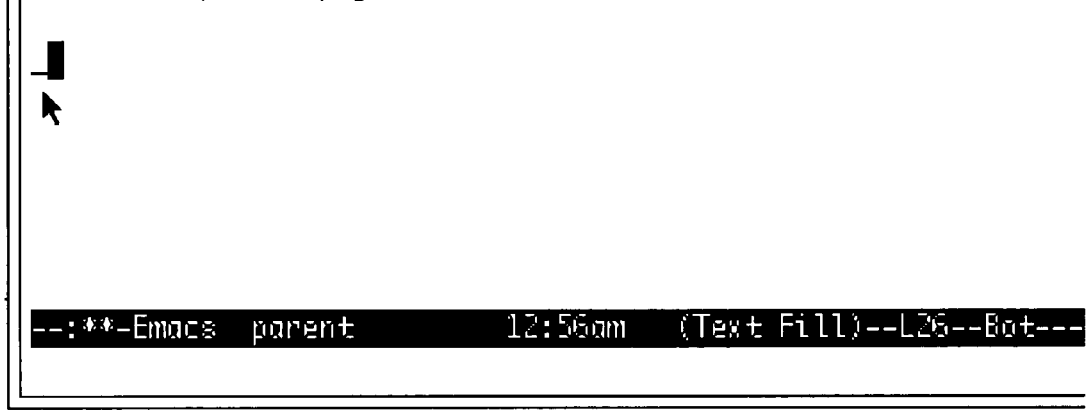
Figure 4F:
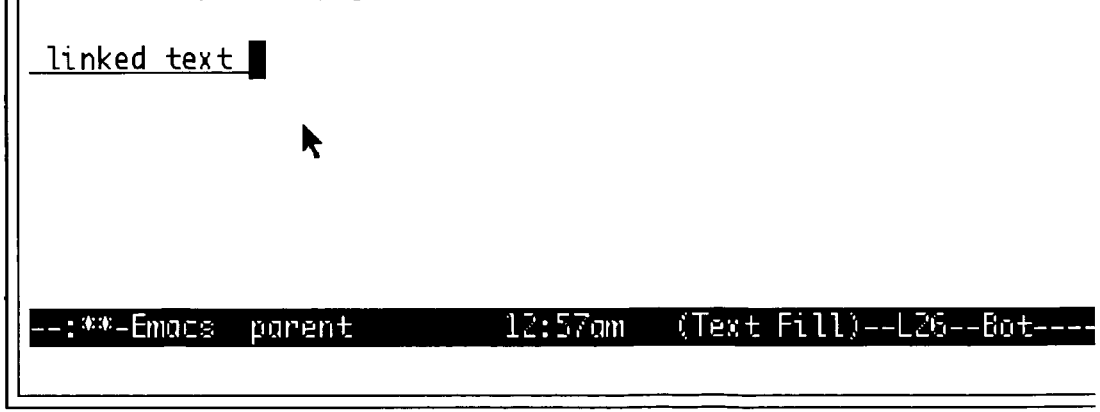

FIG. 4E shows the parent buffer immediately after execution of the bud command. The marked text has been cut and replaced by an expandable link that points to the new timestamped file. In the preferred embodiment, this is equivalent to inserting the name of the newly budded file as an HREF value. In this implementation, the expanded link is illustrated as a blank underscored region. The link can be expanded by the user, as shown in FIG. 4F. As the user enters linked text into the expandable link ("linked text"), the underlined region grows to the size of the linked text. While the user may enter any desired text into the expandable link, it is likely that the user enters text that describes the contents of the newly created page.

In FIG. 4G, the user has selected the linked text by placing the cursor within the expandable link. The command M-x view4edit is in the minibuffer and is about to be executed on the link. view4edit accesses the name of the file pointed to by the link, in this case the timestamped file produced by executing bud in FIG. 4D. When the command is executed, the contents of the new file will be displayed on a new page, i.e., the bud, in a new buffer. The linked text is used to name the buffer in which the bud is displayed. FIG. 4H shows the bud that was created by executing bud in FIG. 4D. The name of the buffer is "linked text," the linked text that was inserted over the expandable link in FIG. 4F. The bud contains a body of text consisting of two items: a colon back-link that points back to the parent of the bud and the region of marked text that was cut from the parent in FIG. 4D. The colon representation of the back-link is purely illustrative and can be replaced by any suitable indication of a back-link. However, it is important that a back-link be distinguishable (although not necessarily to the user) from a link between budz and from a parent to a bud. FIG. 4I shows the same buffer with the back-link selected and the view4edit command about to be executed on the link. Executing the command will display the parent of this bud. Finally, FIG. 4J shows again the parent page shown in FIG. 4G, this time after executing view4edit on the back-link in the bud. The buffer is still named "parent." Note that view4edit does not rename a buffer reached via a back-link.

EXAMPLE 2

FIGS. 5A–5KK show buffer contents during a mutually recursive use of the two functions bud and view4edit, with multiple revisions, to create a tree of pages. Example 2 represents a more complicated use of the present invention. The following terminology is used in describing Example 2:

A page P is numbered with a subscript indicating the order in which it was created. The first page is denoted $P_1$, the second $P_2$, the third $P_3$, and the fourth $P_4$. Revisions of pages $P_1$, $P_2$, $P_3$, and $P_4$ are denoted by superscripts. For example, the original version of $P_1$ is denoted $P_1$. After its first revision, $P_1$ is denoted $P_1^2$. After its second revision, it is denoted $P_1^3$. In the following example, $P_1$ undergoes a total of six revisions to create $P_1^7$; $P_2$ is revised four times to eventually create $P_2^5$; $P_3$ is revised once to create $P_3^2$; and $P_4$ is revised once to create $P_4^2$.

Revisions on a page occur by altering the body of text, denoted BT, or the linked text, denoted LT. Numbering of body of text and linked text is analogous to numbering of pages. Thus body of text of a particular page is denoted with a subscript. For example, the body of text belonging to page $P_1$ is denoted as $BT_1$. The body of text of $P_2$ is denoted as $BT_2$; the body of text of $P_3$ is $BT_3$; and the body of text of $P_4$ is $BT_4$. Revisions of bodies of text $BT_1$, $BT_2$, $BT_3$, and $BT_4$ are denoted by superscripts. For example, after its first revision, $BT_1$ is denoted $BT_1^2$. After its second revision, it becomes $BT_1^3$. In the following example, $BT_1$ undergoes a total of six revisions to create $BT_1^7$; $BT_2$ is revised four times to eventually create $BT_2^5$; $BT_3$ is revised once to create $BT_3^2$; and $BT_4$ is revised once to create $BT_4^2$.

A link L is numbered with a subscript representing the order in which it was created. For example, $P_1$ first buds $P_2$. $L_1$ denotes the link from $P_1$ to $P_2$. $P_2$ buds next; $L_2$ denotes its link to $P_3$. $P_1$ buds again to create $P_4$; $L_3$ denotes the link from $P_1$ to $P_4$. Revision on links does not occur in Example 2, although it can occur during a standard use of the invention, as described below. $P_3$ is not shown to bud in Example 2 for the sake of clarity, but it can in principle. In fact, any page at any level of the hierarchy can bud. Each of links $L_1$, $L_2$, and $L_3$ has linked text, LT, associated with it that preferably describes the page to which the link points. The linked text on $L_1$ is denoted $LT_1$; the linked text on $L_2$ is denoted $LT_2$; and the linked text on $L_3$ is denoted $LT_3$.

A buffer name N is denoted with a subscript. For example, the buffer name of $P_1$ is $N_1$; the buffer name of $P_2$ is $N_2$; the buffer name of $P_3$ is $N_3$; and the buffer name of $P_4$ is $N_4$. A page P is not considered to be revised upon revisions of N. The buffer name of a viewed page is determined by the associated linked text, LT. Revision of LT correspondingly revises the buffer name of a view4edited buffer. Revisions of buffer names are denoted by a superscript, and occur in Example 2 on $N_2$ and $N_4$. For example, the revision of $N_2$ is denoted as $N_2^2$, and the revision of $N_4$ is denoted as $N_4^2$.

Figure 6:
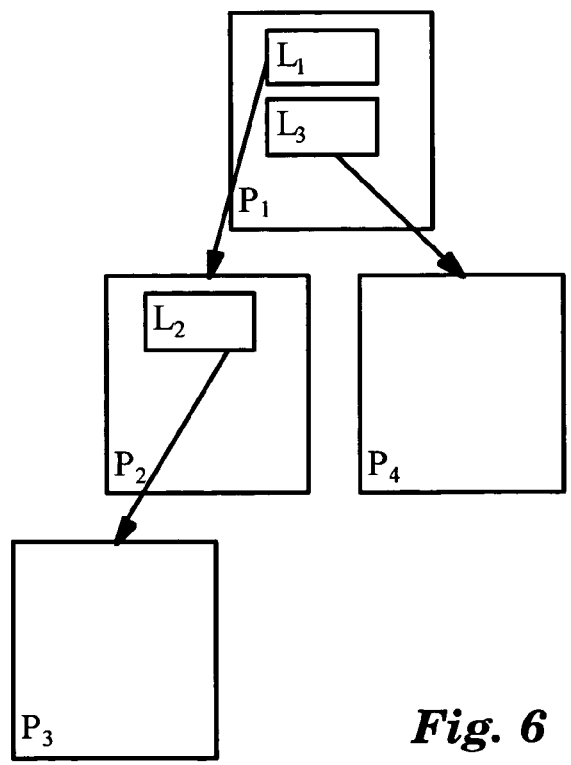
FIG. 6 illustrates a tree of pages created during the implementation of FIGS. 5A–5KK.

In Example 2, $P_1$ buds $P_2$, which buds its own bud, $P_3$. $P_1$ is then revisited to bud again, this time from a different location to bud $P_4$. The result is a tree of pages illustrated schematically in FIG. 6.

Figure 5A:
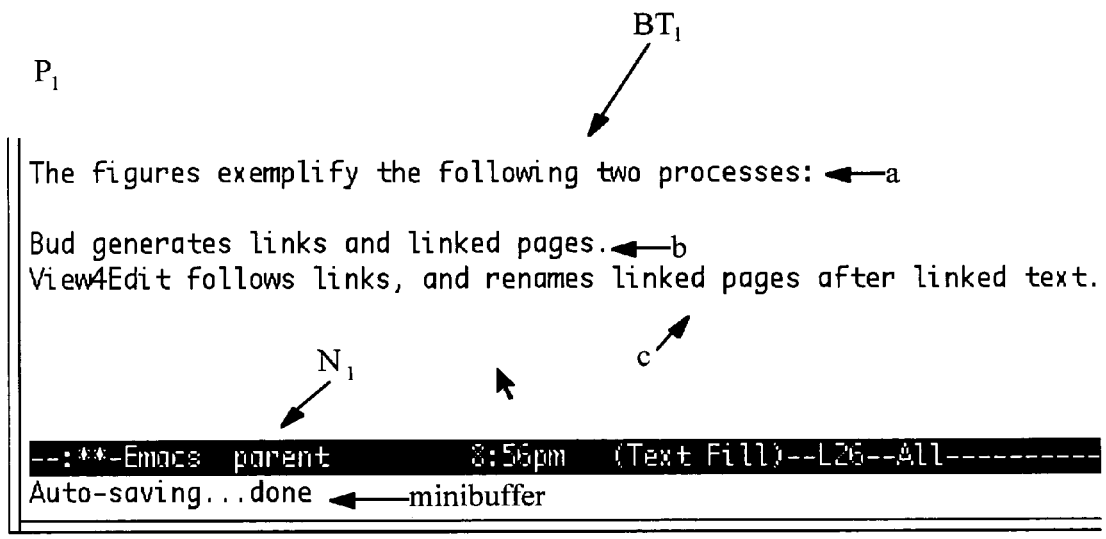
FIGS. 5A–5KK show buffer contents during a mutually recursive and more detailed implementation of the methods of FIGS. 2 and 3.
Figure 5B:
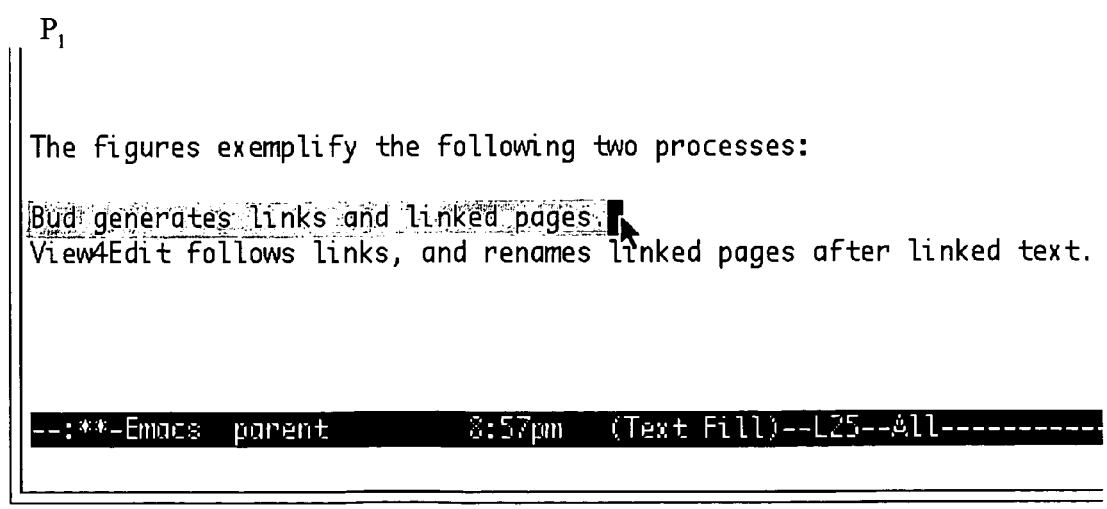
Figure 5E:
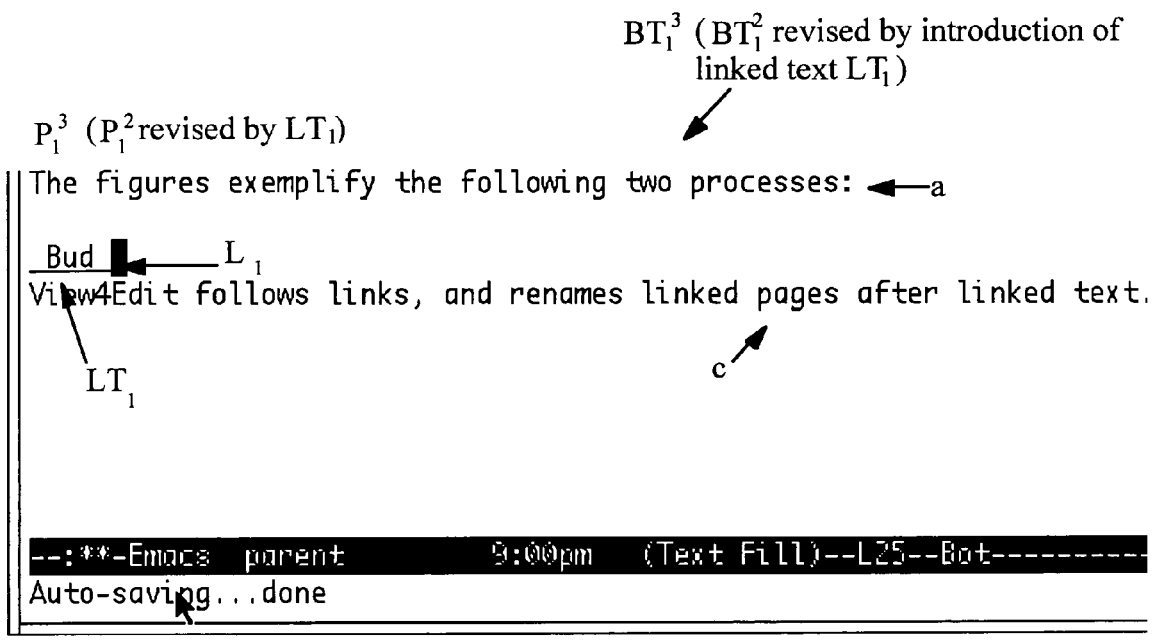
Figure 5F:
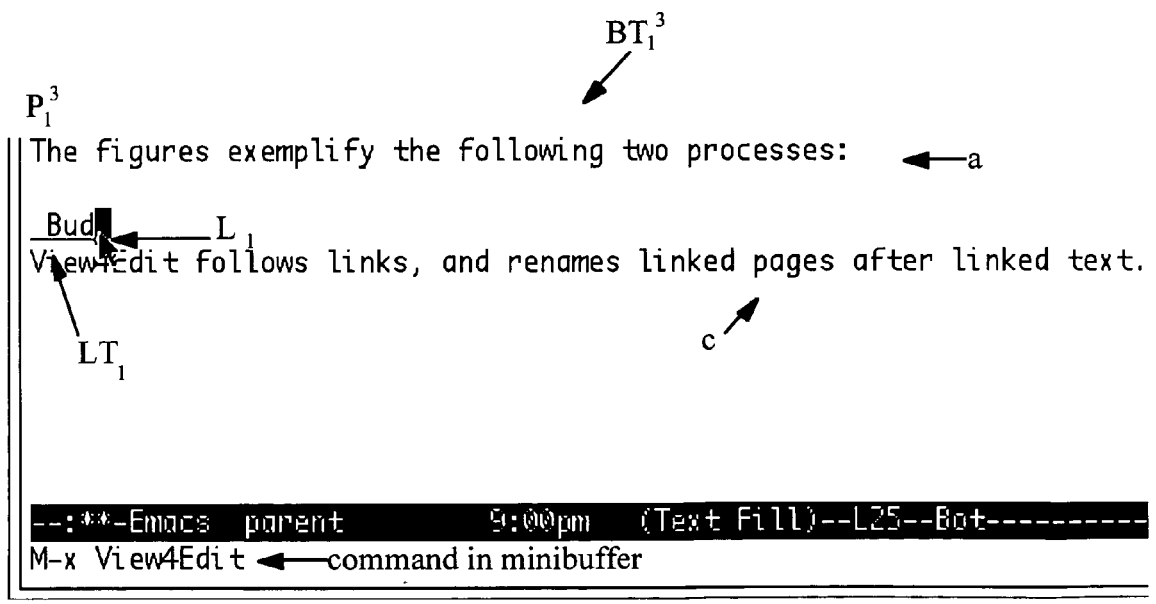
Figure 5G:
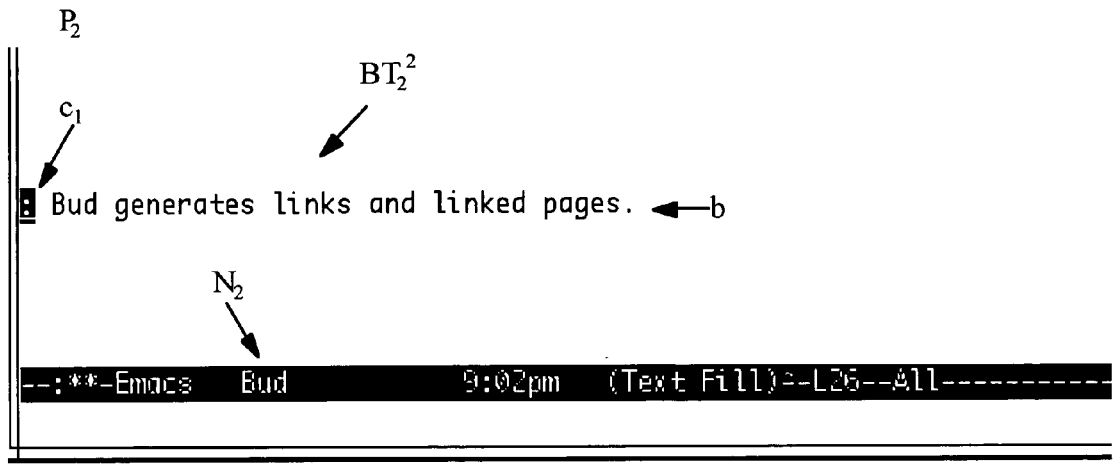
Figure 5H:
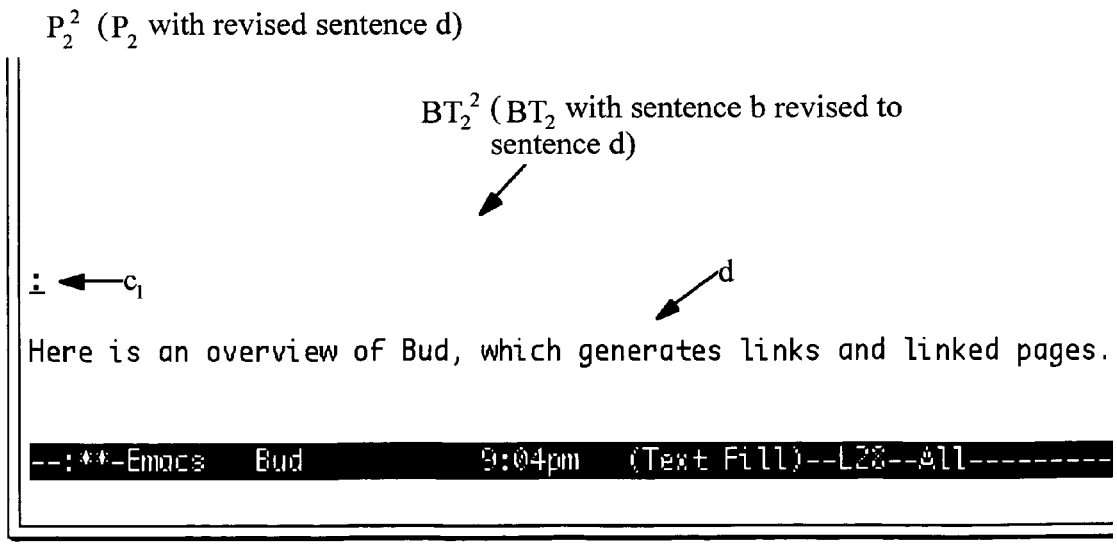
Figure 5I:
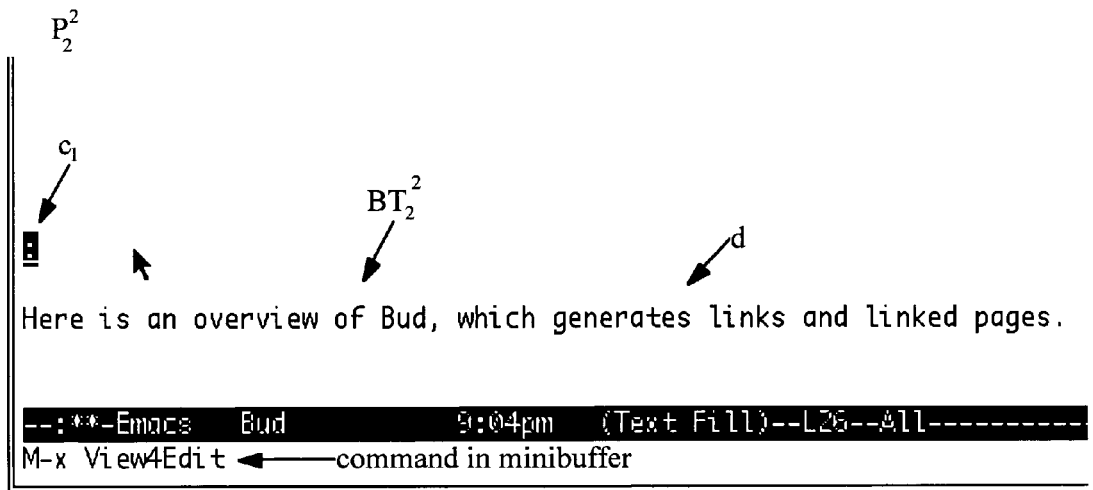
Figure 5J:
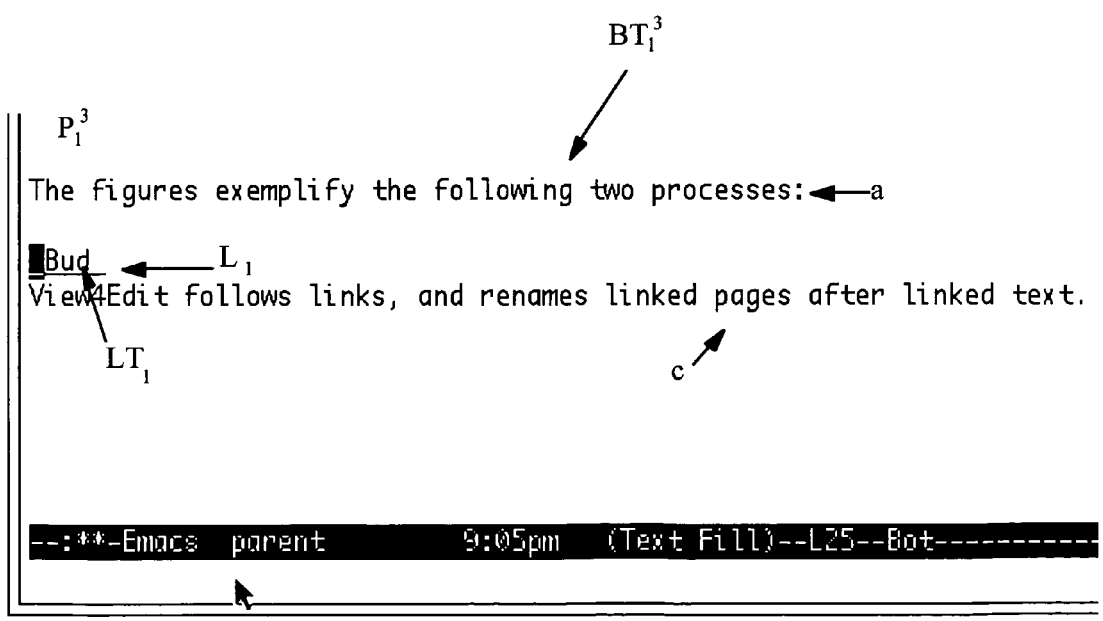
Figures 5K, 5L:
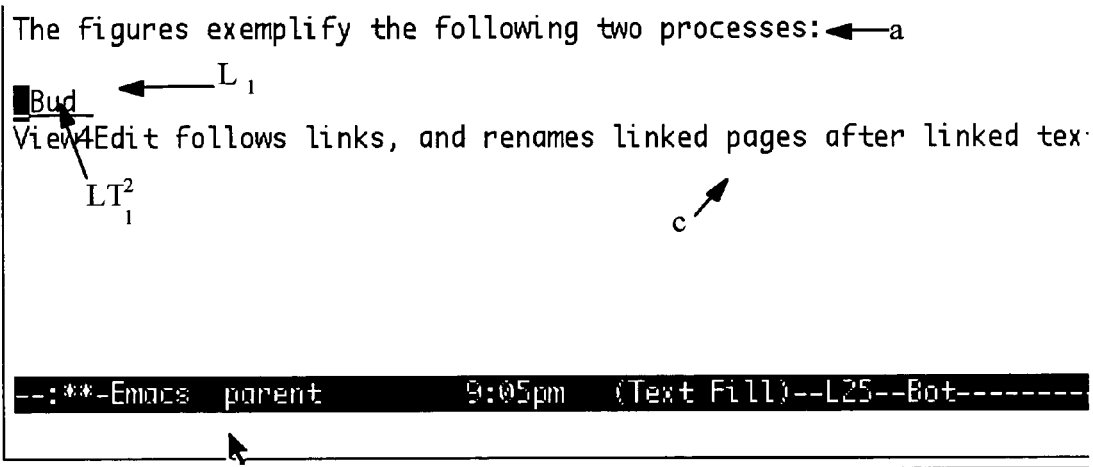
Figure 5M:
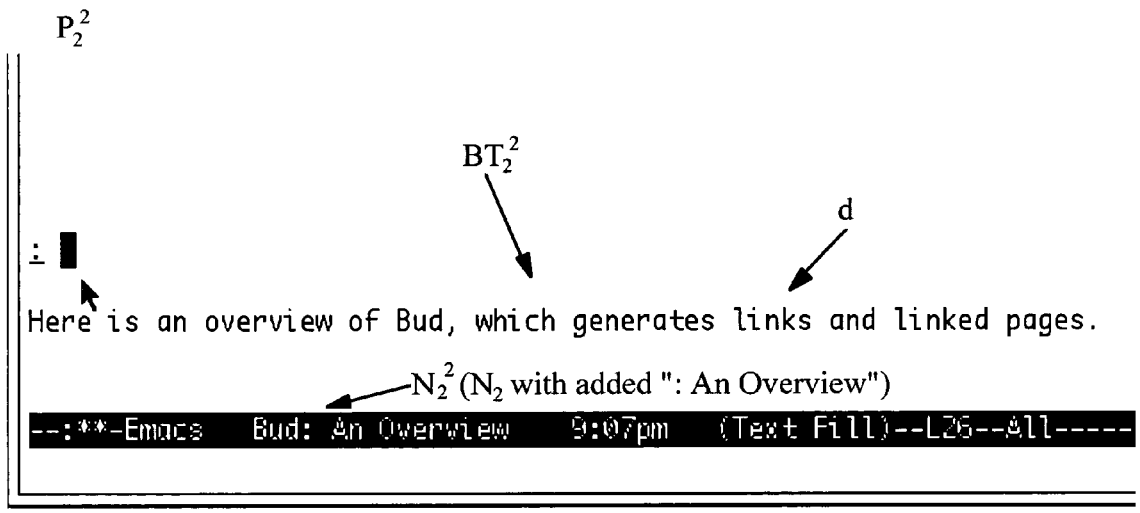
Figure 5N:
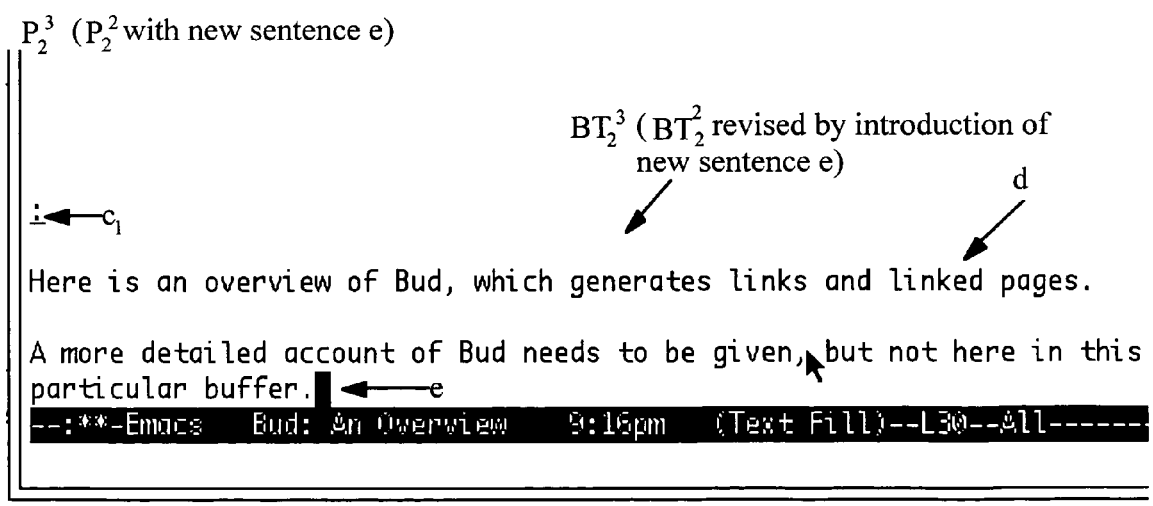
Figure 5O:
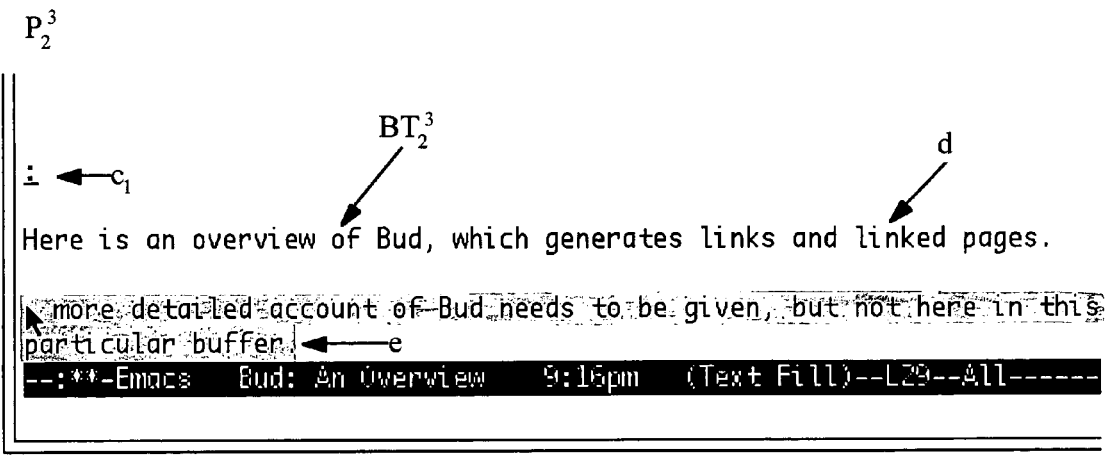
Figure 5P:
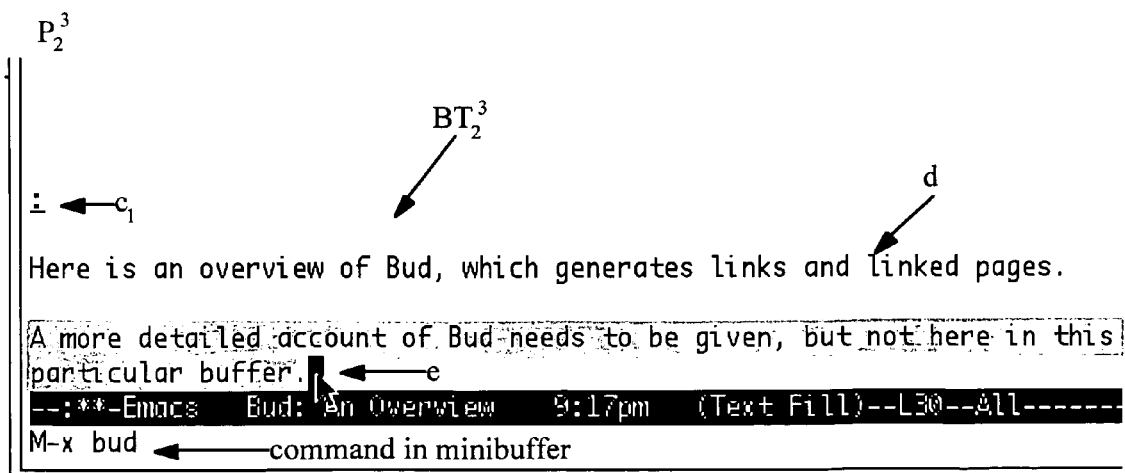
Figure 5Q:
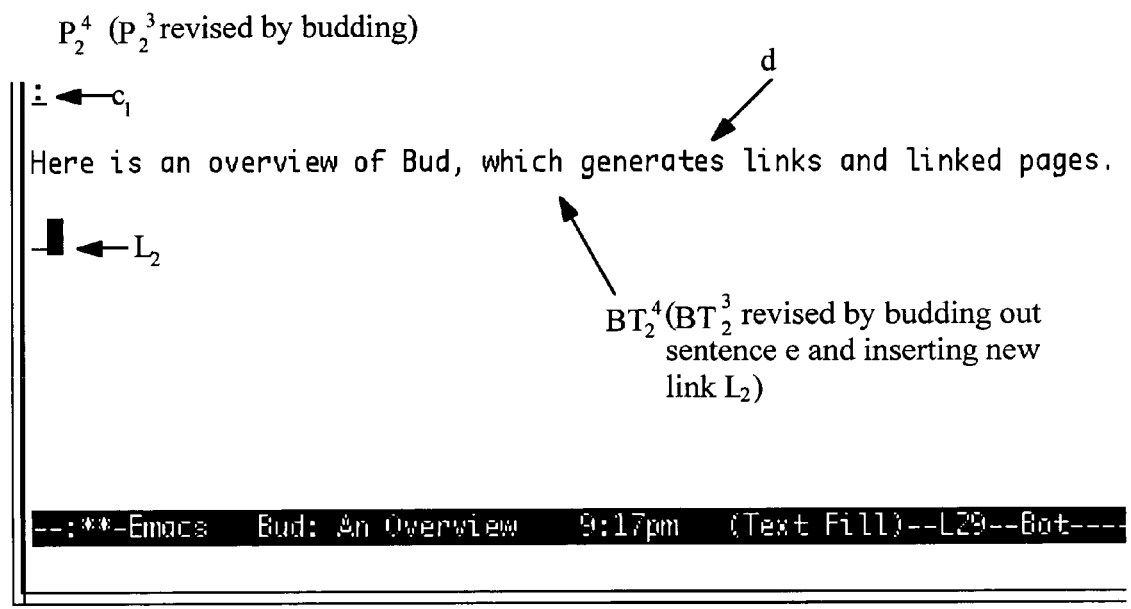
Figure 5R:
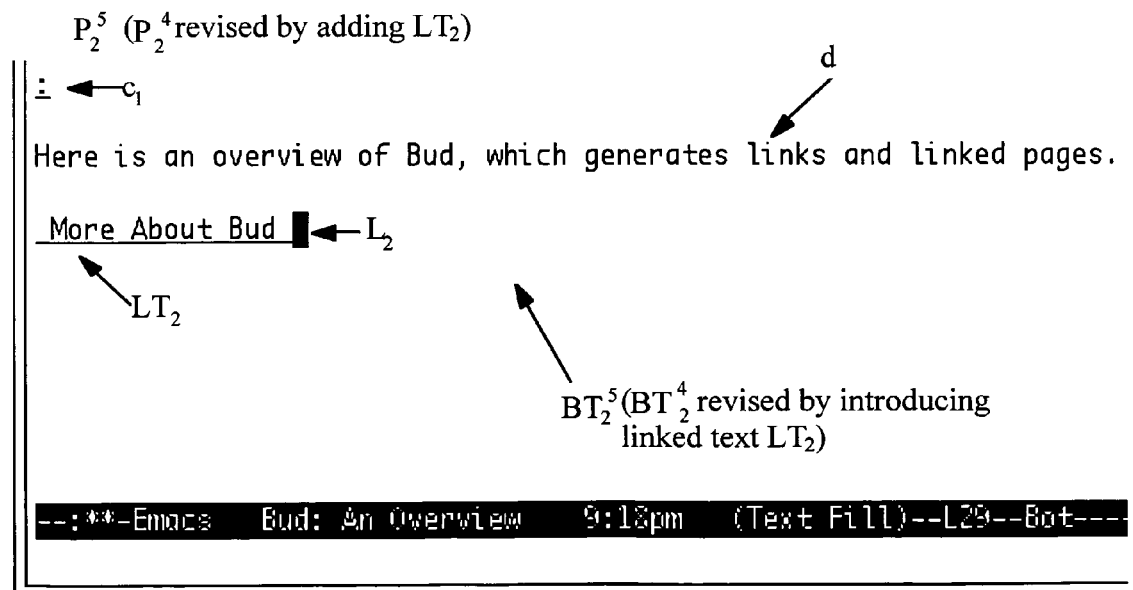
Figure 5S:
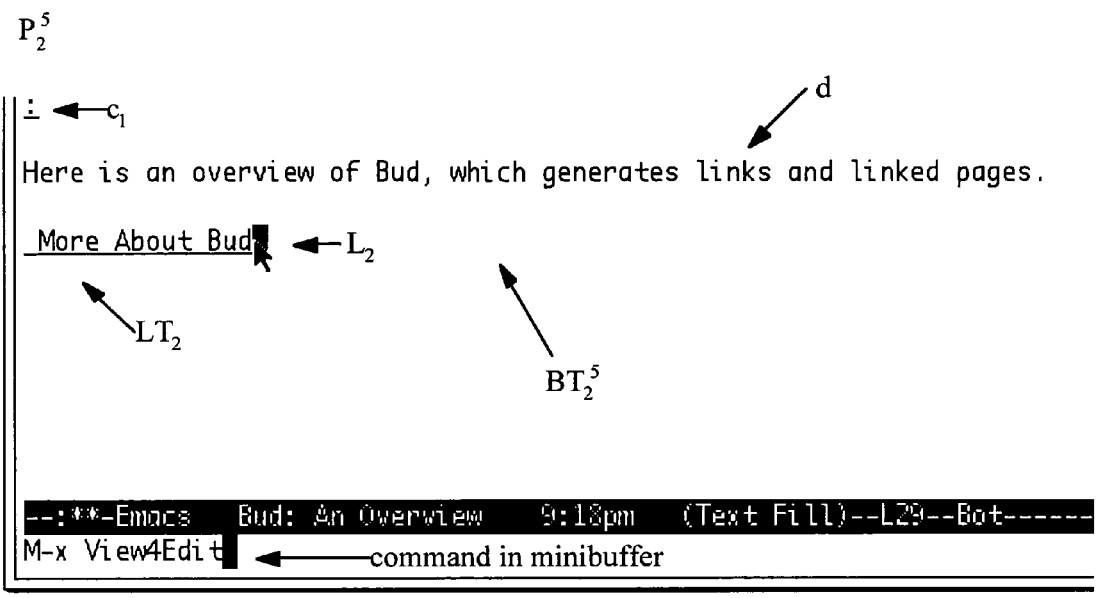
Figure 5T:
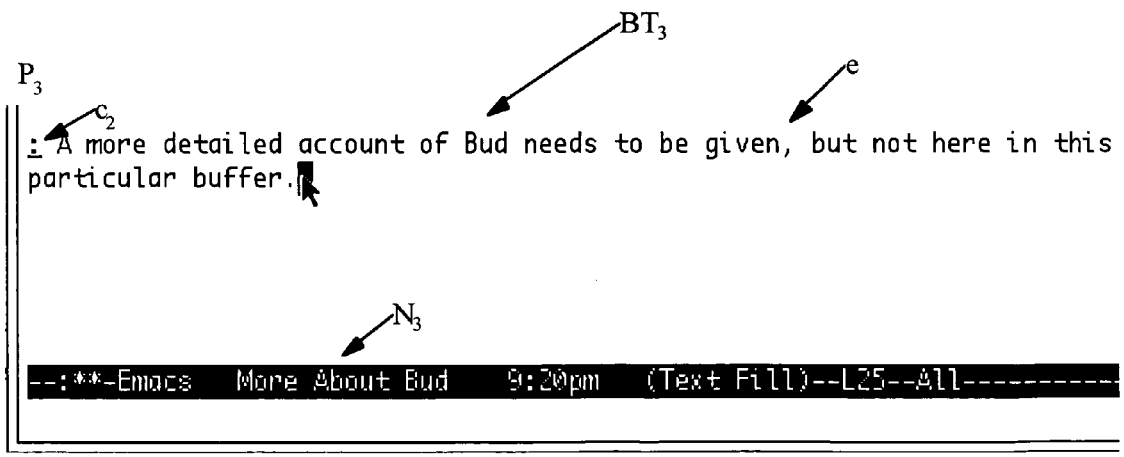
Figure 5U:
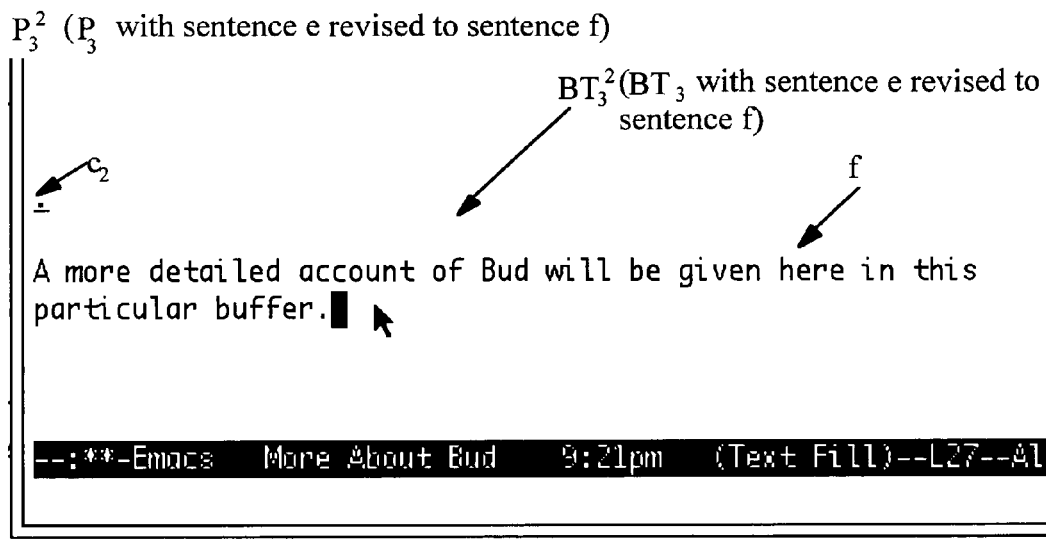
Figure 5V:
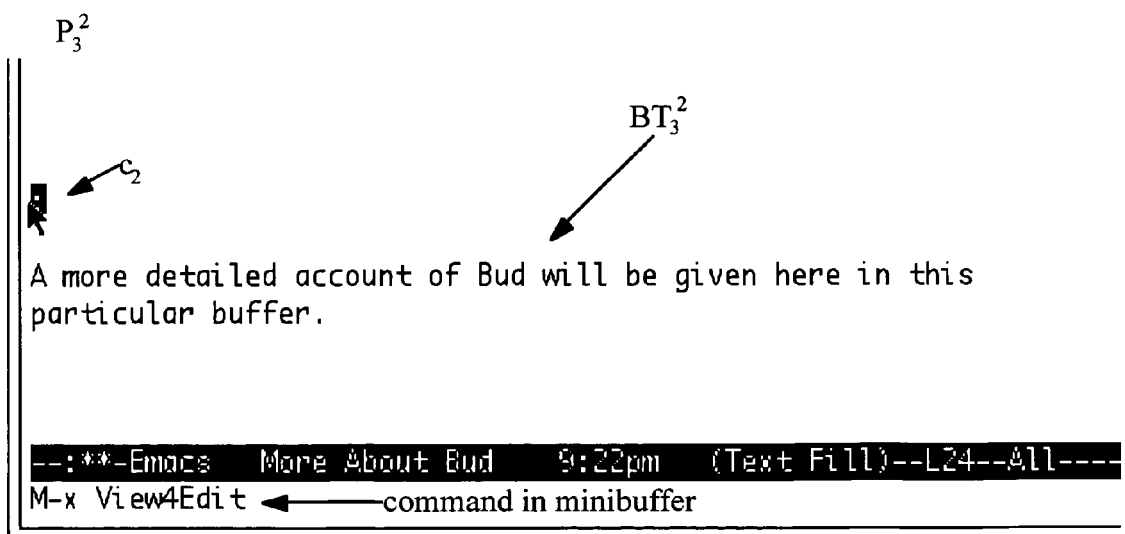
Figure 5W:
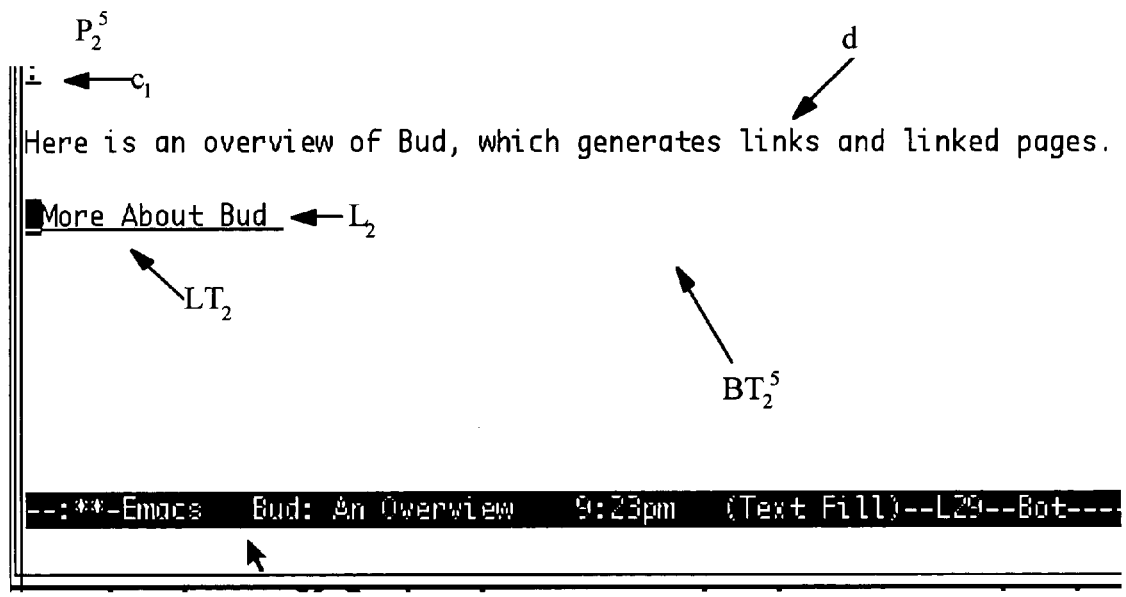
Figure 5X:
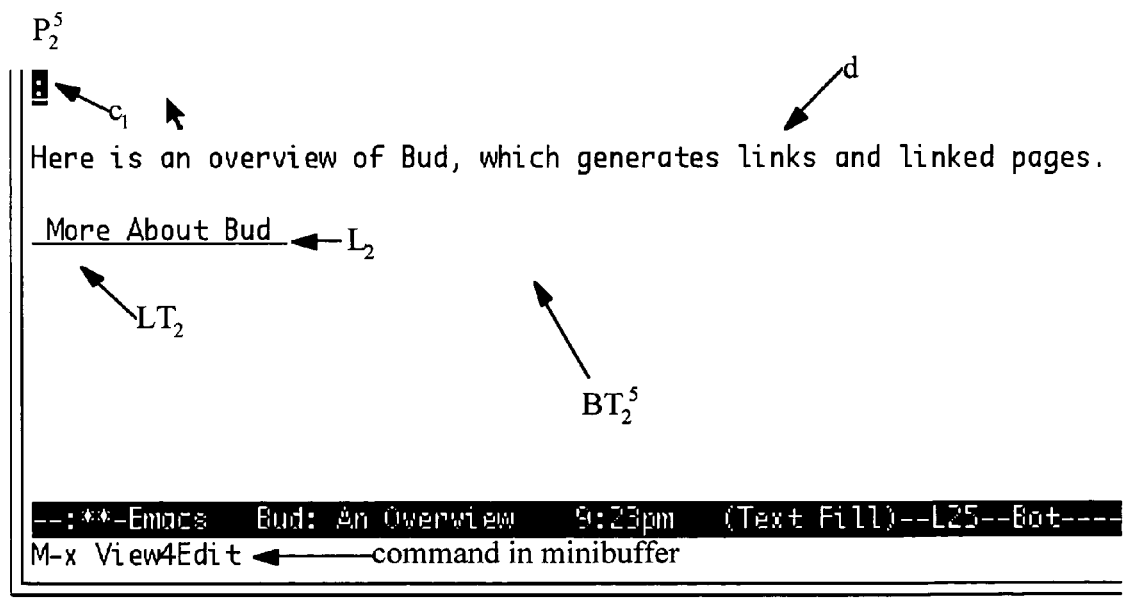
Figure 5Y:
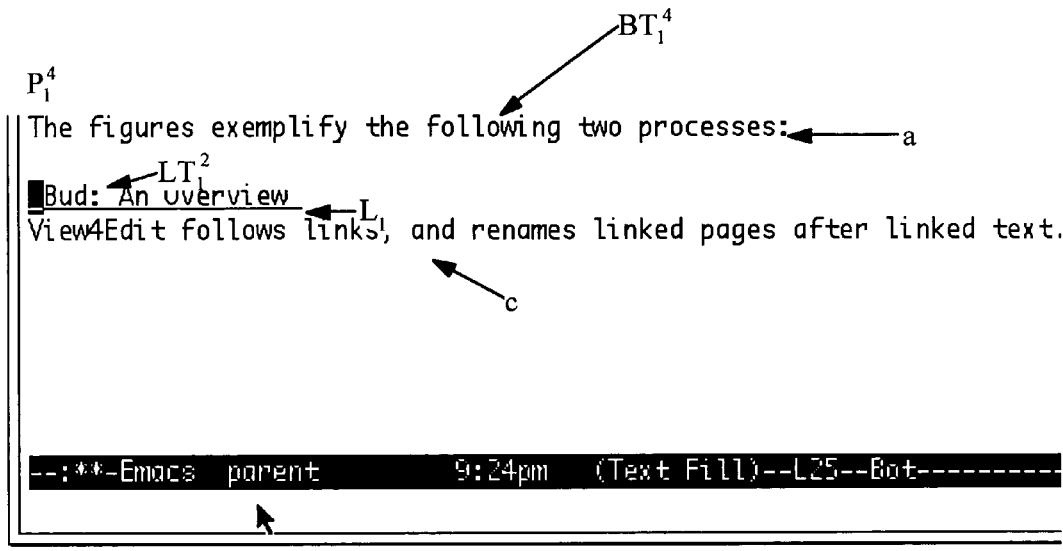
Figure 5Z:
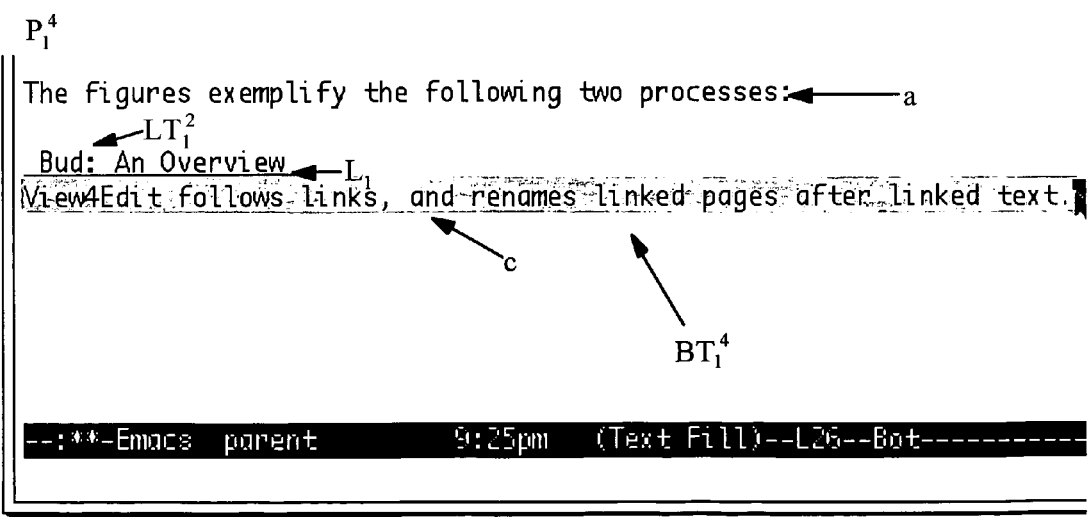
Figure 5A:
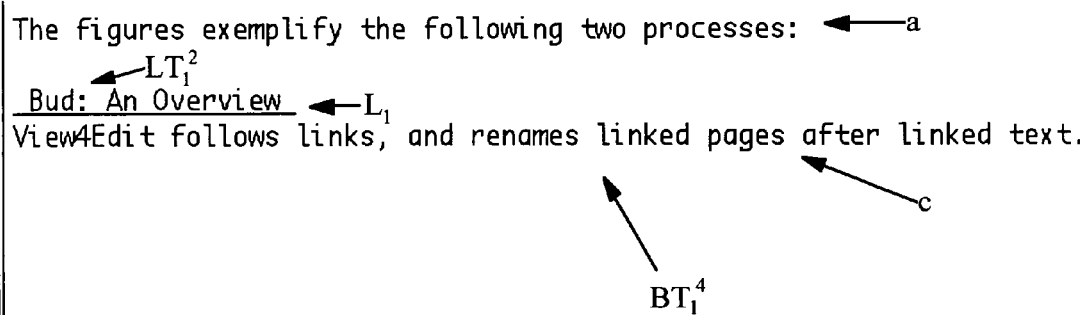
Figure 5B:
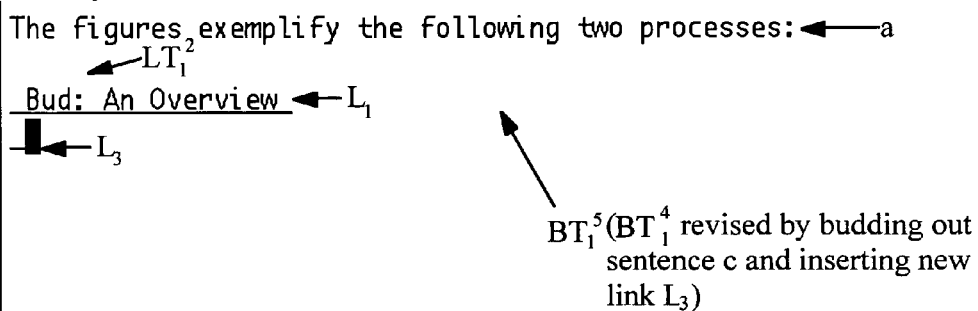
Figure 5C:
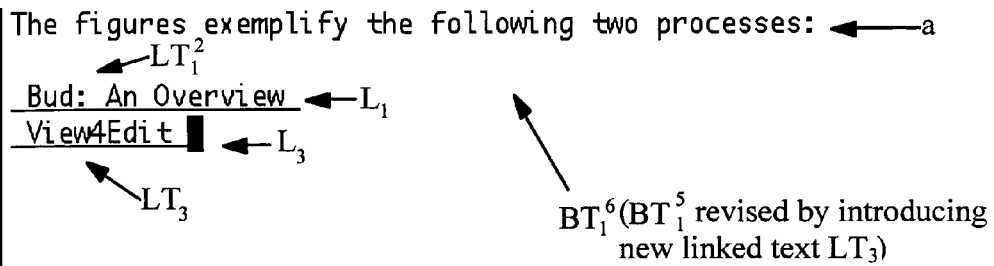
Figure 5D:
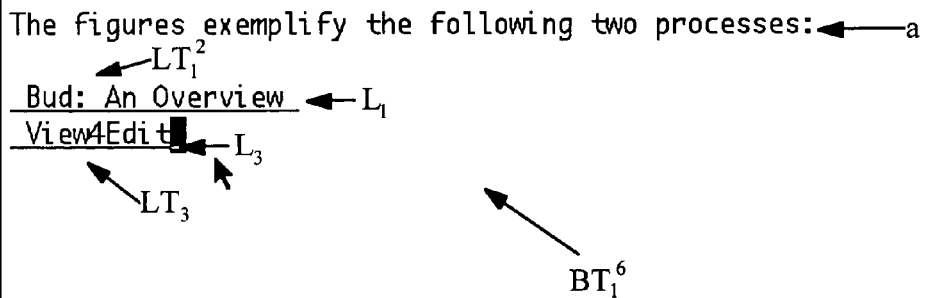
Figure 5E:
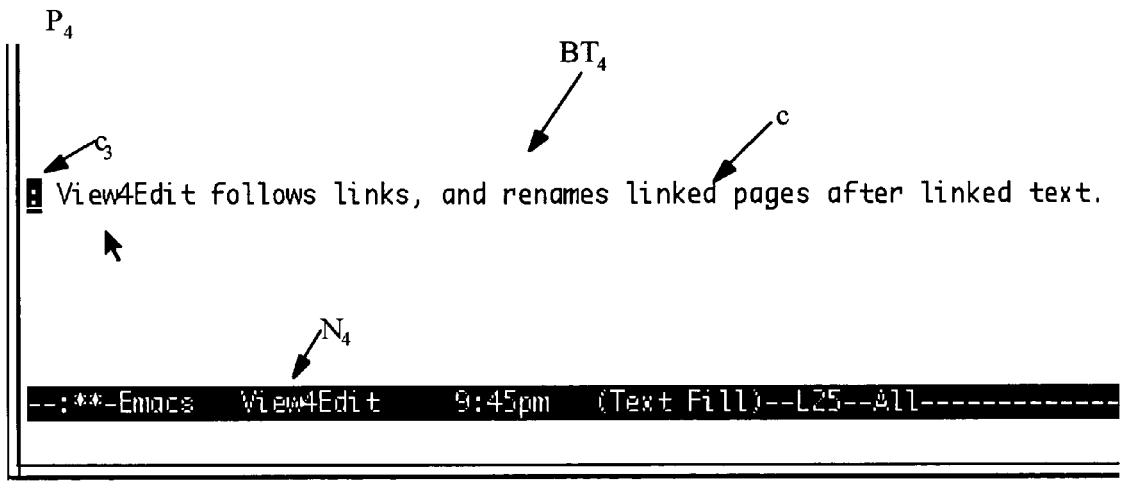
Figure 5F:
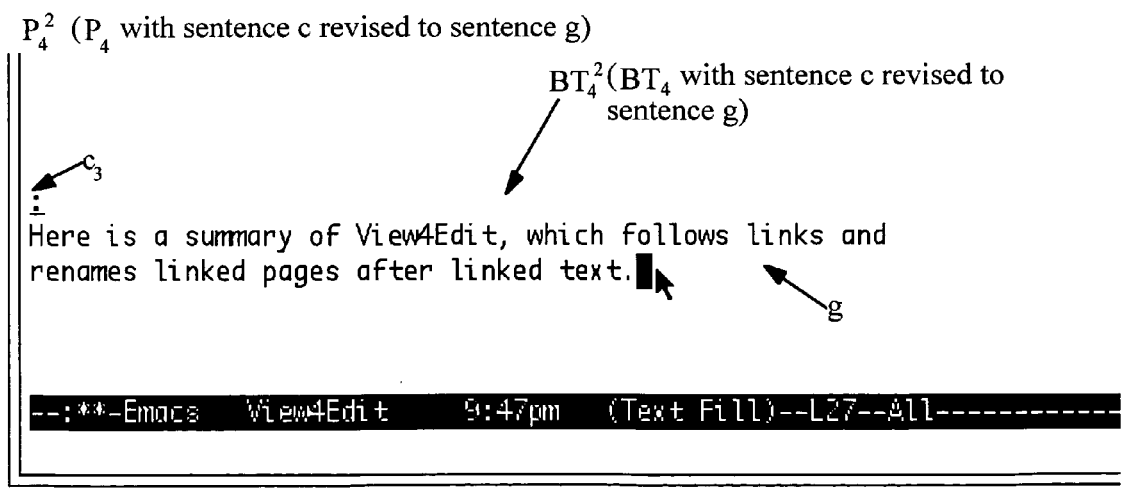
Figure 5G:
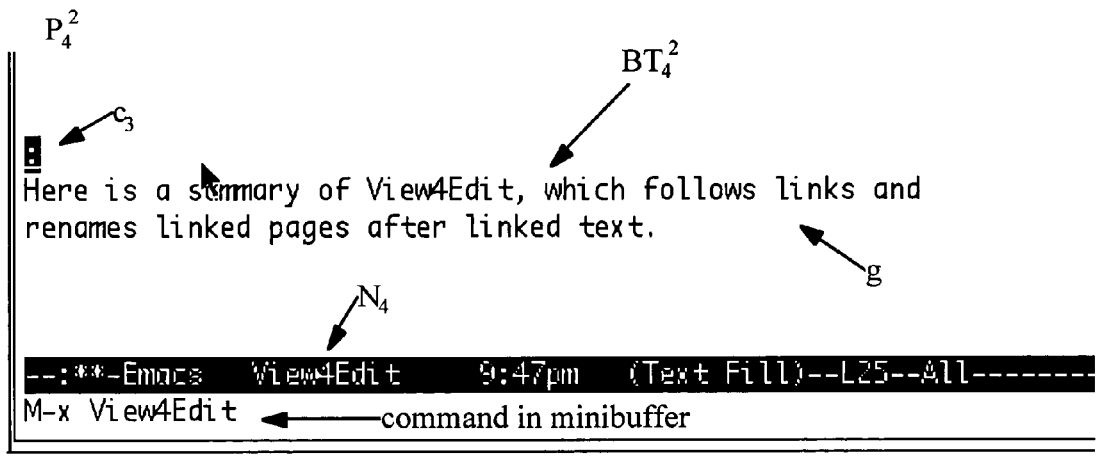
Figure 5H:
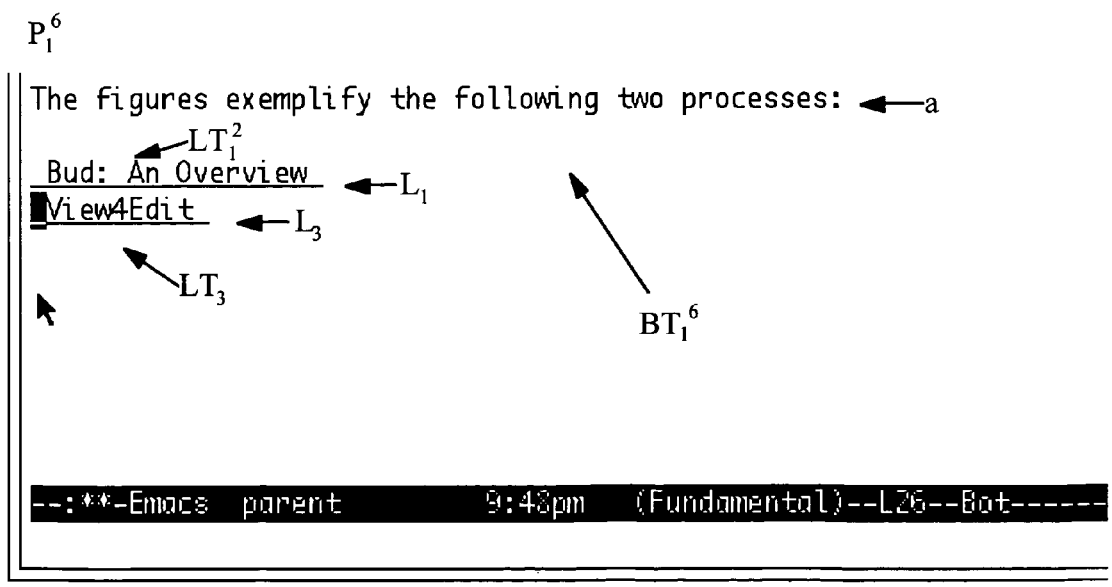
Figure 5I:
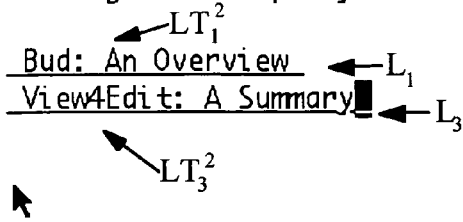
Figure 5J:
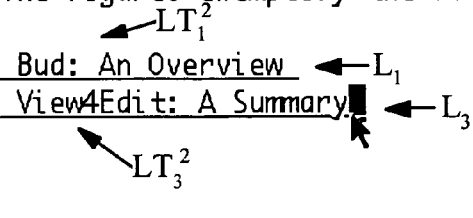
Figure 5K:
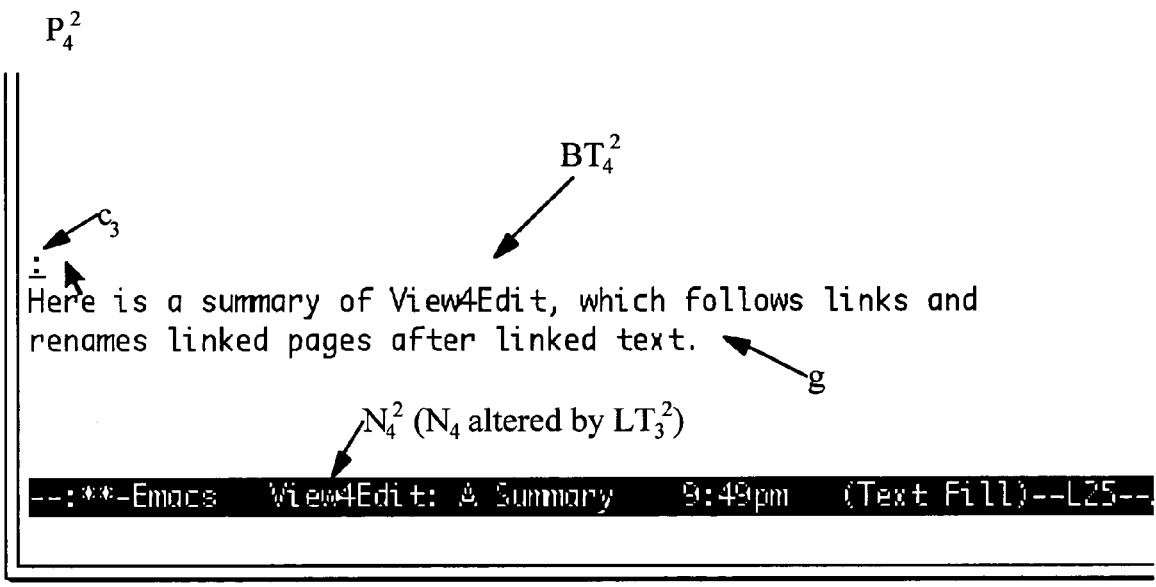

FIGS. 5A–5KK illustrate different buffers at various stages of the budding and editing process:

FIGS. 5A–5F are of $P_1$ during budding;
FIGS. 5G–5I are of $P_2$ being revised;
FIGS. 5J–5L are of $P_1$ being revised;
FIGS. 5M–5S are of $P_2$ during revision and budding;
FIGS. 5T–5V are of $P_3$ being revised;
FIGS. 5W–5X are of $P_2$ being viewed to access $P_1$;
FIGS. 5Y–5DD are of $P_1$ undergoing additional budding;
FIGS. 5EE–5GG are of $P_4$ being revised;
FIGS. 5HH–5JJ are of $P_1$ being revised;
FIG. 5KK is of $P_4$.

FIG. 5A shows a buffer named "parent" ($N_1$) containing a body of text $BT_1$ of a page $P_1$. $BT_1$ contains the following three sentences:

(a) "The figures exemplify the following two processes."

(b) "Bud generates links and linked pages."

(c) "View4Edit follows links, and renames linked pages after linked text."

FIG. 5A contains the original version of page $P_1$. FIG. 5B shows the same page, $P_1$, with a region of marked text; in this case, sentence (b) is highlighted. In FIG. 5C, the command "M-x bud" has been entered into the minibuffer. The result of executing the command is shown in FIG. 5D: sentence (b) has been cut and replaced with an expandable link $L_1$. As a result of the budding, new versions $BT_1^2$ and $P_1^2$ are generated. $L_1$ points to another file, the contents of which can be viewed and edited as a page in a different buffer. The new file (described below) was created by the function bud and given a timestamp as a name, and contains sentence (b) that was cut from $P_1$. Page $P_1$ is further modified by the user as shown in FIG. 5E: the text "Bud" is inserted in the expandable link $L_1$ and serves as linked text $LT_1$. Introduction of the linked text modifies the body of text to $BT_1^3$ and the page to $P_1^3$. In FIG. 5F, the user has input "M-x View4Edit" into the minibuffer and selected link $L_1$ by placing the cursor within the link. view4edit is used to follow links, i.e., to display the linked file contents as a page in a new buffer, and names the buffer according to the linked text that was used to access it.

FIG. 5G shows the new page, $P_2$, in a buffer named "Bud," referred to as $N_2$, after execution of view4edit. Page $P_2$ contains a body of text $BT_2$ composed of the following two items:

1. $C_1$, a colon back-link to $P_1^3$, the parent of $P_2$; and 2. sentence (b), initially in $P_1$ (FIG. 5A), which was budded to create $P_1^2$ (FIGS. 5C–5D).

FIG. 5H shows the same page after a revision by the user to sentence (b) to obtain sentence (d), "Here is an overview of Bud, which generates links and linked pages." Revising (b) to (d) updates $BT_2$ to $BT_2^2$ and, correspondingly, $P_2$ to $P_2^2$. In FIG. 5I, the user has selected the back-link $C_1$ and entered M-x View4Edit into the minibuffer. Executing the command opens (or returns to, if already opened) the parent buffer displaying $P_1^3$, the parent of $P_2^2$, as shown in FIG. 5J (identical to FIG. 5E). In this case, executing view4edit on the back-link leads to a particular location in $P_1^3$, the location of the link $L_1$. Note that the buffer name has not changed and remains "parent."

FIG. 5K shows $LT_1$ revised to $LT_1^2$, "Bud: An Overview." The revision of linked text by the user reflects the revision previously made in the linked page $P_2^2$ (FIG. 5H). This modification of linked text has changed the body of text $BT_1^3$ to $BT_1^4$. This, in turn, has caused a modification of the page $P_1^3$ to $P_1^4$. FIG. 5L shows $P_1^4$ with the cursor on the link $L_1$ to $P_2^2$, just before view4edit is executed on it. FIG. 5M shows $P_2^2$ after view4edit has been executed on the link $L_1$ of FIG. 5L. The body of text $BT_2^2$ is unchanged. However, the buffer name, $N_2$, has been changed to $N_2^2$, "Bud: An Overview" to reflect the modified linked text in FIG. 5K.

FIG. 5N shows $P_2^2$ after the addition of a new sentence (e), "A more detailed account of Bud needs to be given, but not here in this particular buffer." Addition of (e) has revised the body of text $BT_2^2$ to $BT_2^3$ and changed $P_2^2$ to $P_2^3$. FIG. 5O shows the body of text $BT_2^3$ in $P_2^3$ with sentence (e) marked. FIG. 5P shows $P_2^3$ just before bud is executed on marked sentence (e) to create a new file containing the marked sentence. By executing bud on a file that is already a bud of a parent, a third level of hierarchy is created. FIG. 5Q shows a modification on the body of text $BT_2^3$ to $BT_2^4$ that resulted from budding in FIG. 5P. Specifically, the marked sentence has been cut and replaced with an expandable link, $L_2$. Changing the body thus has effected an overall change in $P_2^3$ to $P_2^4$. FIG. 5R shows the introduction of linked text, "More About Bud," referred to as $LT_2$, over link $L_2$. This addition of text has modified the body $BT_2^4$ to $BT_2^5$, which in turn modifies the page $P_2^4$ to $P_2^5$ FIG. 5S shows $P_2^5$ with the cursor over the link $L_2$, just before view4edit is executed on it. Executing the command opens the new linked page $P_3$ that was created by executing bud in FIG. 5P, as shown in FIG. 5T. $P_3$ appears in a buffer $N_3$ named "More About Bud" and contains a body of text $BT_3$ that consists of the following two items:

1. $C_2$, a colon back-link to the parent of $P_3$, $P_2^5$; and 2. (e), the sentence that was initially added to create $P_2^4$ (FIG. 5N) and budded to create $P_2^5$ (FIGS. 5P–5Q).

FIG. 5U shows sentence (e) after it has been revised to sentence (f), "A more detailed account of Bud will be given here in this particular buffer." Revision of (e) to (f) alters the body of text from $BT_3$ to $BT_3^2$. Likewise, an overall change in $P_3$ to $P_3^2$ is effected.

Colon back-links can be followed to return to the original parent page. FIG. 5V shows $P_3^2$ with the cursor over the colon back-link $C_2$, just before view4edit is executed on it to arrive at $P_2^5$, the parent of $P_3^2$, as shown in FIG. 5W. Note that FIG. 5W contains the same body of text as does FIG. 5R. The same command is then executed on $P_2^5$ in FIG. 5X to display $P_1^4$, the parent of $P_2^5$, in FIG. 5Y. FIG. 5Y is the same as FIG. 5K, which shows a body of text, $BT_1^4$, composed of the following items:

1. sentence (a);

2. link $L_1$;

3. linked text $LT_1^2$ of $L^1$; and 4. sentence (c).

The budding process is then repeated for sentence (c) to create another bud from parent page $P_1^4$. FIG. 5Z shows $P_1^4$ (FIG. 5Y) after sentence (c) has been marked in preparation for budding. bud is then executed on marked sentence (c), as shown in FIG. 5AA, to yield $P_1^5$, shown in FIG. 5BB. Body of text $BT_1^4$ has been modified to $BT_1^5$. Specifically, marked sentence (c) has been cut and replaced with an expandable link $L_3$. $L_3$ points to a new file, the contents of which can be viewed and edited as a page $P_4$ in a different buffer. The new file was created by bud and given a timestamp as a filename, and contains sentence (c) that was cut from $P_1^4$ FIG. 5CC shows the introduction by a user of linked text, "View4Edit," referred to as $LT_3$, over link $L_3$. This addition of linked text modifies body of text $BT_1^5$ to $BT_1^6$, in turn modifying page $P_1^5$ to $P_1^6$ FIG. 5DD shows $P_1^6$ with the cursor on link $L_3$ just before view4edit is executed on it to open a buffer named "View4Edit," referred to as $N_4$, which contains page $P_4$, shown in FIG. 5EE. Page $P_4$ contains the body of text $BT_4$, which is composed of the following two items:

1. $C_3$, a colon back-link to $P_1^6$, the parent of $P_4$; and 2. sentence (c), which was most recently in $P_1^4$ (FIG. 5Y) and budded to create $P_1^5$ (FIGS. 5AA–5BB).

FIG. 5FF shows $P_4$ after sentence (c) has been revised to sentence (g), "Here is summary of View4Edit, which follows links and renames linked pages after linked text." Modification of sentence (c) to (g) effects an overall change in body of text $BT_4$ to $BT_4^2$, thereby correspondingly revising $P_4$ to $P_4^2$ FIG. 5GG shows $P_4^2$ with the cursor on colon back-link $C_3$, just before view4edit is executed on it to display parent $P_1^6$ of $P_4^2$, as shown in FIG. 5HH. FIG. 5HH contains the same page and body of text as FIG. 5CC.

FIG. 5II shows linked text $LT_3$ revised by the user to $LT_3^2$, "View4Edit: A Summary." The revision of linked text reflects the revision previously made in the linked page, $P_4^2$ (FIG. 5FF). This modification of linked text also changes body of text $BT_1^6$ to $BT_1^7$, causing a modification of page $P^{16}$ to $P_1^7$. When view4edit is executed on link $L_3$ to $P_4^2$, as shown in FIG. 5JJ, page $P_4^2$ is viewed in a buffer named "View4Edit: A Summary," shown in FIG. 5KK. The body of text $BT_4^2$ is unchanged from FIG. 5GG, but the buffer name $N_4$ has been changed to $N_4^2$ to reflect the revision of linked text $LT_3$ to $LT_3^2$ in FIG. 5II.

The methods of the invention can be modified to yield a number of alternative embodiments. For example, hyperlinks can be implemented as anchors. Anchors are similar to hyperlinks, but instead of pointing to a page, point to a particular location on the page. This functionality is especially useful for back-links, which preferably point back to the linked text associated with the bud. Hyperlinks can also point to particular locations of budz. For example, they can point to the beginning of the marked text that was cut from the parent page.

The view4edit process can be modified to function even if a user has not selected a hyperlink. For example, if only one hyperlink is present in the current buffer, its page is opened by default. Alternatively, the closest hyperlink to the cursor is located and its file opened.

While back-links are illustrated as colons, any suitable representation of back-links can be used. Back-links can also be invisible, meaning that they are not displayed to the user on a display device such as a monitor. They can, however, be accessed by a user with a standard keyboard or mouse command that is known by the user. Invisible back-links do not require the user to select a particular location in the file being viewed.

A link can also be represented explicitly, rather than as hypertext. For example, (view4edit "for example" 1-10am1/28/2000)

is a LISP function that, when evaluated, displays the file whose name is the timestamp 1-10am1/28/2000 in a buffer named for example. In this case, rather than a hyperlink, the file is said to contain a reference to the bud.

Note also that the reference or hyperlink does not need to contain explicitly the filename of the linked-to file. It is sufficient for the reference to contain a uniquely identifying function of the filename. For example, a hyperlink can be numbered according to the order in which it is created using Arabic numerals: 1, 2, .... The files to which the hyperlinks refer can be named with corresponding Roman numerals: I, II, .... The connection between the hyperlink and filename is made by determining the corresponding Roman numeral to the hyperlink number. While this example is very straightforward, any translation between hyperlink and filename can be employed, provided that both the hyperlinks and filenames are unique (i.e., once a name is used for either a hyperlink or a filename, it is never used again). In fact, the hyperlink and filename can be chosen randomly and stored in a translation table that stores the association between hyperlinks and filenames. The user still does not need to know the filename in order to view or edit the file.

While newly created files are preferably automatically named by the timestamp at which they are created, they can also be named by any injective function of the timestamp, i.e., any function that maps different timestamps to different names. The timestamp can be transformed in any systematic way to obtain a filename. Note that this achieves the same result of using the timestamp itself (which is also an injective function of the timestamp) as the filename: the name remains transparent to the user and is unique. The name is also indicative of the time at which the file was created and can therefore be used in version control applications (discussed below).

While the present invention has been described with respect to a buffer and minibuffer into which a 25 user enters typewritten commands, it will be apparent to one of skill in the art that numerous other methods exist for an author to submit bud and view4edit commands. For example, standard windows-based menus can be used, and version control data may be communicated through dialog boxes. Alternatively, the bud command can be initiated by a user by dragging the highlighted text from the parent page to another entity, such as the desktop. (Dragging selected text on to the Desktop can create a bud as an icon whose corresponding file contains the marked text.) Various icons can be provided to represent bud and view4edit commands.

Furthermore, the invention can be implemented without the buffers illustrated in FIGS. 4 and 5. Any editing means, editor, or content viewer can be used to provide the files to the user for viewing or editing.

The view4edit function described above can be extended to track the history of its use. In this implementation, each hyperlink has an associated history list that records all previous and current versions of its associated linked text. When the command is executed, the current linked text and the time at which the command was executed is entered into that link's history list.

For example, when view4edit is executed on link $L_1$ in FIG. 5F, linked text $LT_1$, "Bud," is recorded in the history list, along with the time at which the command was executed. When it is again executed on link $L_1$ in FIG. 5L, the current version of the linked text, "Bud: An Overview," is recorded into the history list. Similarly, the history list for $L_3$ contains two entries, "View4Edit" and "View4Edit: A Summary."

Figure 7:
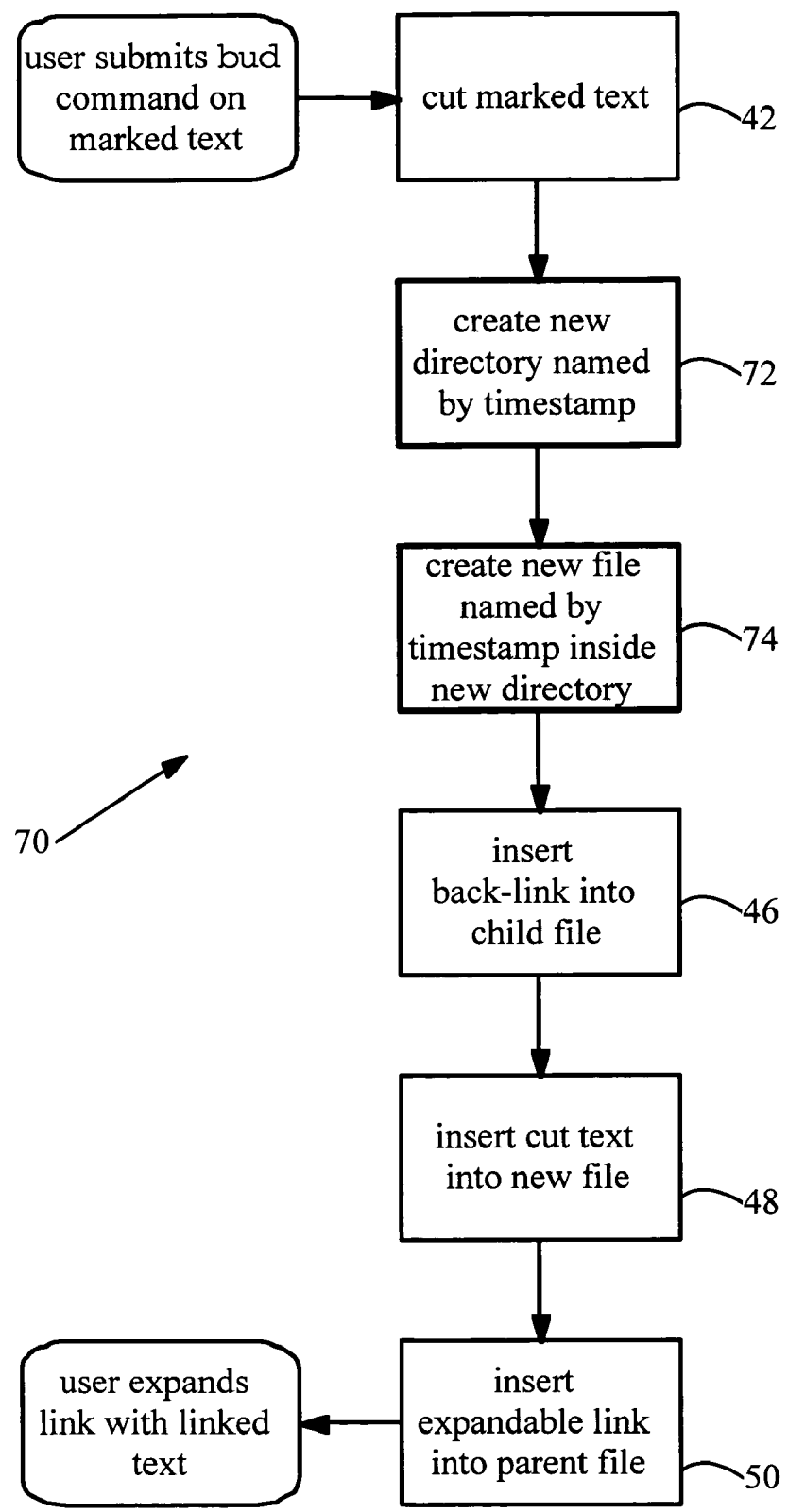
FIG. 7 is a flow diagram of a versioning embodiment of a method for creating new linked contexts.

An important modification of the above-described preferred embodiment incorporates versioning into budding and editing of pages. Different versions of a budded page are stored, and the user can select the version to be displayed when a link is selected or return to previous versions. This versioning embodiment of the invention is implemented by representing a bud with a directory, rather than a single file, and storing all versions of the bud within the directory. An alternative embodiment 70 of a bud method according to the versioning embodiment is shown in the flow diagram of FIG. 7. Method 70 is similar to bud method 40 of FIG. 2, but has an additional step 72 and a modified step 74, shown in heavier-lined boxes. As with method 40, a user submits the bud command on a continuously marked region of content in a page $P_1$. In step 42, the marked content is cut from $P_1$. A new directory is created in step 72 and preferably named by a uniquely identifying function of the timestamp, which may be simply the timestamp itself, at which the bud command was executed. A new file $P_2$ is created in step 74 and stored in the new directory. The new file $P_2$ is also named by a uniquely identifying function of the timestamp at which the bud command was executed, preferably the same name as was given to the directory. In steps 46 and 48, a back-link to the parent file $P_1$ and marked content are inserted into the newly created file $P_2$. Finally, an expandable link pointing to the new file $P_2$ is inserted into the parent file $P_1$ in step 50. The expandable link may appear as a blank underscored region, and the user can enter text into the blank region to expand the link, thereby creating linked text.

Figure 8:
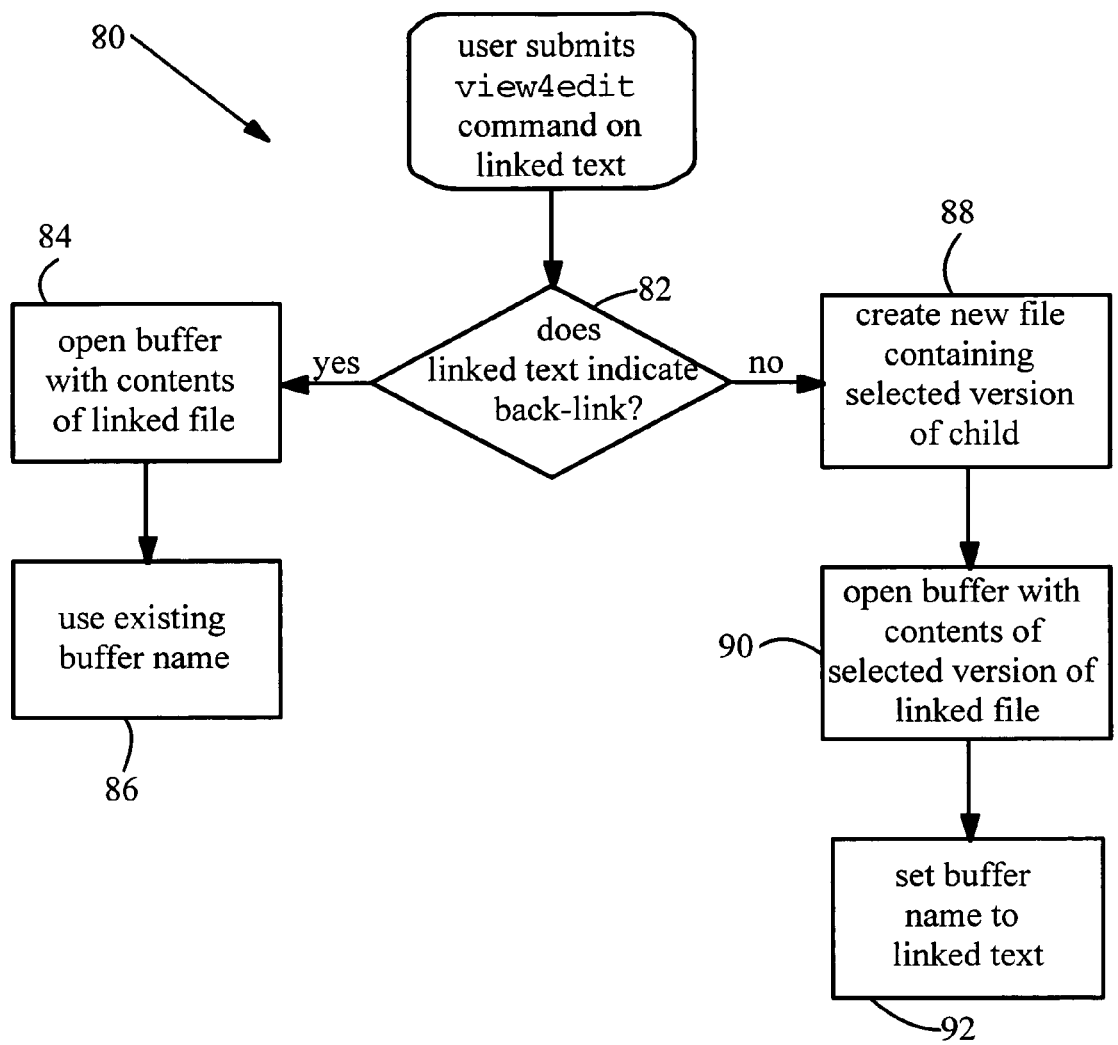
FIG. 8 is a flow diagram of a versioning embodiment of a method for viewing and editing linked contexts.

An alternative embodiment 80 of a view4edit method using versioning is shown in the flow diagram of FIG. 8. A user selects a hyperlink and submits the view4edit command to view and edit the linked page. Depending upon the type of hyperlink selected, the method is implemented differently, and a determination is first made in step 82. If the selected hyperlink is a back-link, then the method proceeds as with the preferred embodiment: in step 84, a buffer is opened with the contents of the linked-to parent file; and in step 86, the existing buffer name is used. If the selected hyperlink is not a back-link, then there are typically multiple versions of the linked-to page stored within a single directory that was created during budding. Preferably, the hyperlink always points to the first version of the file, i.e., the one with the same name as the directory. Alternatively, the hyperlink can just point to the directory. When the command is executed, a new version of the file is created in step 88 and named with a uniquely identifying function of the timestamp at which the command was executed. The new version of the file is a copy of one of the versions, preferably the most recent, stored in the directory. That is, when the view4edit command is executed, the directory in which the linked-to file is stored is identified, and the most recently saved file in the directory is copied into the new version. Note that this allows the hyperlink to remain the same when new versions of a file are created; there is no need to change the hyperlink to refer to new versions of the file. Also note that the user is not required to name the new file, or even to know that the new file exists. In step 90, a new buffer is opened containing the contents of the newly created file and, in step 92, named by linked text associated with the hyperlink on which the command was executed.

Figure 9:
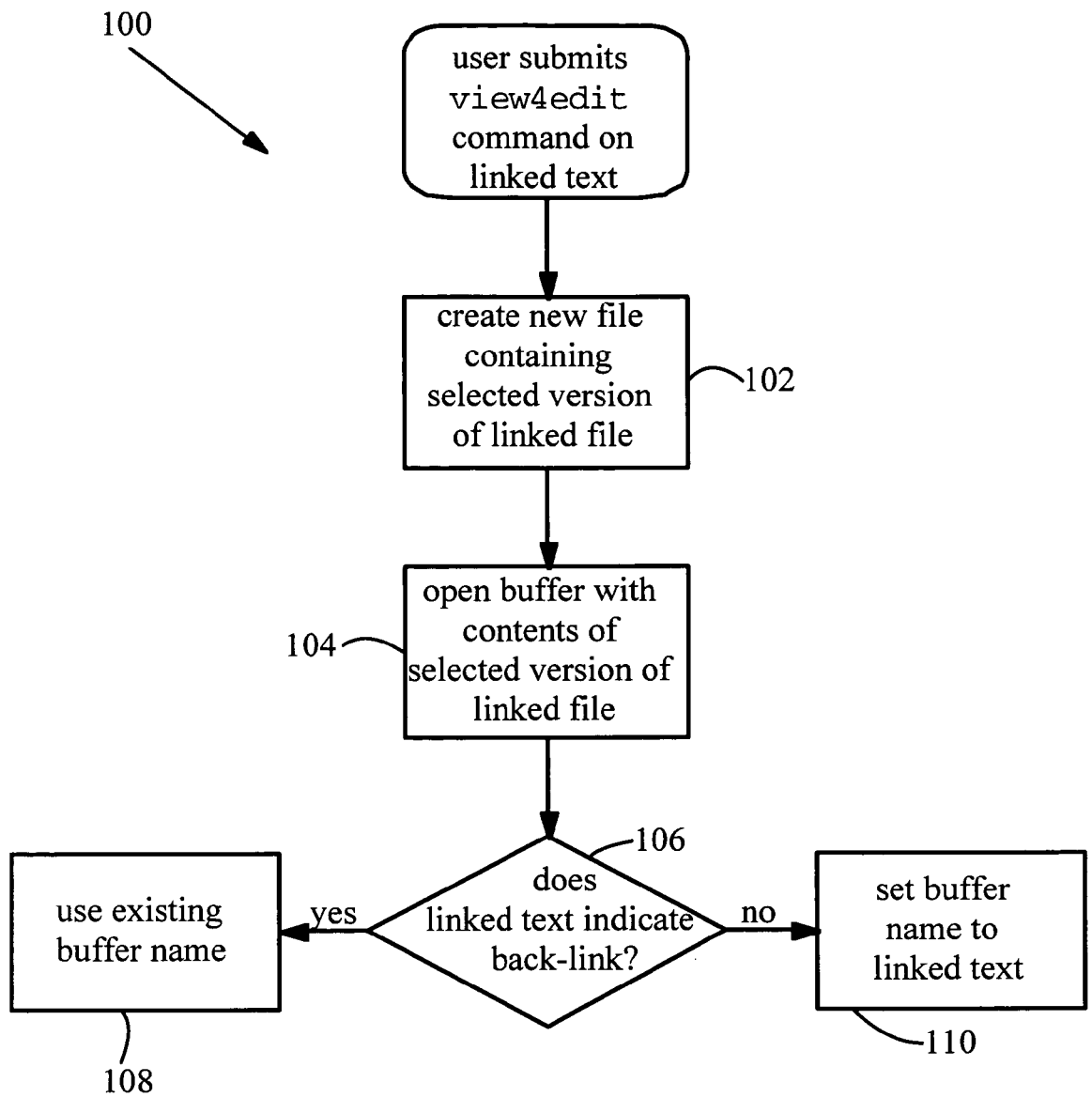
FIG. 9 is a flow diagram of an alternative versioning embodiment of a method for viewing and editing linked contexts.

Alternatively, a more systematic approach can be used to incorporate version control of parent files. FIG. 9 illustrates a method 100 in which a new version is always saved upon execution of view4edit, regardless of the type of hyperlink. In step 102, a new file is created containing the selected version of the linked-to file, which may be a bud or a parent file. A buffer is opened containing the contents of the selected version in step 104. In step 106, a determination is made of the type of hyperlink. If the hyperlink is a back-link (step 108), then the existing buffer name is used. If not (step 110), then the buffer is named after the associated linked text.

Preferably, the view4edit command selects the most recent version of the file to create the new version and to show to the user. In an extension of the method, the user can identify which of the versions is the desired version. For example, upon submitting the command, the user can be shown a list of all available versions and select the one to be edited. The selected version is then copied into a new file and shown to the user. Alternatively, the most recent file can be selected, and the user can reject the selection, for example by submitting a command named not. The previous version is then copied into a new file and shown to the user. The user can repeat the rejection until the desired file is reached. When the page is published, a selected link always leads to the most recent version of the file, which may be a copy of an earlier version that was selected by the author.

In some editors, the buffer name is fixed to be the file name. That is, the name of the buffer cannot be changed without changing the name of its associated file. In this case, the invention can be implemented by creating a time-stamped directory in which the file is stored. The directory can be used with both the preferred embodiment and the versioning embodiment. The name of the file inside the directory can then be chosen arbitrarily and made to conform to its associated linked text.

It is to be understood that the flow diagrams described above are illustrative of merely the broad logical flow of the steps to achieve methods of the invention and that steps may be added to or removed from the diagrams without departing from the scope of the invention. Furthermore, while the steps are shown in a particular order, it is to be understood that steps can be performed simultaneously or in a different order. As will be apparent to one of average skill in the art, additional considerations in implementing the methods may dictate changes in the selection and order of steps.

In general, the methods described herein include one or more steps performed by software routines executed in a computer system such as system 10. The routines may be implemented by any means known in the art. For example, any number of computer programming languages, such as Java, C++, or LISP may be used. Furthermore, various programming approaches such as procedural, object oriented, or artificial intelligence techniques may be employed. The software for implementing the steps described above is embodied as computer readable code stored in system memory (ROM 24 or RAM 26) or on a computer readable storage medium such as a hard disk or CD-ROM.

As an illustration of one possible implementation of a preferred embodiment of the invention, the Appendix provides functions written in Emacs-LISP v19+. It is to be understood that the functions in the Appendix are for illustration purposes only and in no way limit the scope of the present invention.

It will be clear to one skilled in the art that the above embodiments may be altered in many ways without departing from the scope of the invention. Accordingly, the scope of the invention should be determined by the following claims and their legal equivalents.

APPENDIX

```
;;; This function makes a bud and is called on an area of marked text
;;; in what is going to be the parent. It creates a new file that is
;;; simply named with a timestamp, in which it inserts the marked text,
;;; and a link pointing back to the parent. It then creates a link in
;;; the parent, going to the new file.
(defun bud ( ) (interactive)
;;setting variables "bfr" and "time".
    (let
        ((bfr (current-buffer))        ;sets "bfr" to be the "current-buffer",
                                       ;which is the buffer in which this
                                       ;function was called.
            (time (current-time-string)))   ;sets "time" to be the
                                            ;"current-time-string"
                                            ;at which the function
                                            ;was called.
        (kill-region (point) (mark))   ;cuts the marked region and places it
                                       ;on the kill-ring.
    (save-excursion
        (find-file-other-window time)  ;creates a new file named with
                                       ;the "time".
        (insert-string ":")            ;inserts a colon, ":", in the first position
                                       ;of the new file. With the following two
                                       ;lines of code, it establishes a link
                                       ;pointing back to the parent.
        (put-text-property 1 2 'face 'underline)   ;bestows the colon with a
                                                   ;face text property,
                                                   ;underline. This makes
                                                   ;the underlines a user
                                                   ;will recognize as links.
        (put-text-property 1 2 'WebEditor
                   (buffer-name bfr))  ;puts the parent's buffer
                                       ;name, "bfr", as the
                                       ;colon's 'WebEditor text
                                       ;property.
                   (yank)    ;yanks the marked text from the kill-ring
                             ;into the new file.
        (save-WebEditor))
        (switch-to-buffer bfr)    ;switches back to the parent.
;; The following lines insert in the parent an expandable blank, out of
;; which a link to the new file will be made. The user can type text
;; into this blank to create linked text.
        (insert-string "  ")
        (put-text-property (- (point) 1)
    (point) 'face 'underline)          ;bestows the blank
                                       ;with an underline.
        (put-text-property (- (point) 1) (point) 'WebEditor time)   ;bestows the
                                                                    ;blank with a
                                                                    ;'WebEditor
                                                                    ;text property,
                                                                    ;"time", which
```

-continued

APPENDIX

```
                                              ;is the
                                              ;timestamped
                                              ;name of the
                                              ;new file.
    (save-WebEditor)))
;;; Defining a "view4edit" function that displays a pointed to file when
;;; called on a link. view4edit is called when the point is actually on
;;; a link that must also have linked text. view4edit integrates the
;;; functions of browsing and editing, and effects a context sensitive
;;; naming of pages from linked text. This enables the timestamped
;;; names of files to remain transparent to the user, and used only by
;;; the system to permanently store data. Instead, the user is always
;;; able to view a bud through a buffer named with the linked text of
;;; the link she view4edits.
;;; (view4edit can be generalized to work in cases where the point is
;;; not directly on a link, such that it acts on the nearest previous/
;;; following link.)
(defun view4edit ( ) (interactive)
    ;; setting variables, "new", "pt1", "pt2", and "linked-text".
    (let* ((new (get-text-property (point) 'WebEditor))   ;sets "new"
                                              ;to be the
                                              ;'WebEditor text
                                              ;property of the
                                              ;point, i.e., the
                                              ;timestamped
                                              ;filename of the
                                              ;budded page.
        (pt1 (previous-single-property-change
            (+1 (point)) 'WebEditor (current-buffer) 1))    ;sets
                                              ;"pt1" to be the
                                              ;position of
                                              ;where the
                                              ;'WebEditor text
                                              ;property
                                              ;begins, i.e.,
                                              ;the beginning
                                              ;of the linked
                                              ;text.
        (pt2 (next-single-property-change
            (point) 'WebEditor (current-buffer)
            (point-max)))     ;sets "pt2" to be the position
                                              ;where the 'WebEditor text
                                              ;property ends, i.e., the end
                                              ;of the linked text.
        (linked-text
(buffer-substring pt1 pt2)))        ;sets "linked-text" to be the
                                              ;string of text that exists
                                              ;between pt1 and pt2, i.e.,
                                              ;the linked text. This is
                                              ;the text that appears above
                                              ;the underline users
                                              ;recognize to be links.
    (save-WebEditor)
        (if (exists-buffer new)        ;"new" is a timestamped
                                              ;filename. IF it is already in
                                              ;a buffer, . . .
            (switch-to-buffer-other-window new)    ; . . . THEN simply switch
                                              ;to that buffer . . .
(load-WebEditor new))        ;OTHERWISE, load it from a file.
(if (not (equal linked-text ":"))        ;AS LONG AS "linked-text" is not a
                                              ;colon, ":" (which would indicate
                                              ;a link going back to a bud's
                                              ;parent), THEN . . .
        (rename-buffer linked-text))))    ; . . . rename the buffer
                                              ;with "linked-text". This makes
                                              ;the system's use of timestamped
                                              ;filenames transparent to the
                                              ;user.
;;; The following two functions convert between the standard HTML
;;; representation of a link (i.e., "<A HREF=\"file:") to that used by
;;; the WebEditor. These functions were needed because it turned out
;;; emacs doesn't save text properties across sessions.
;;; Defining an interactive function called, "html2WebEditor", that
;;; takes no arguments. It converts emacs' representation of a link to
;;; that used by WebEditor.
(defun html2WebEditor ( ) (interactive)
    (goto-char 1)
```

-continued

APPENDIX

```
    (while
         (re-search-forward
"//(<A
HREF=\"file:\\)\\([^\"]*\\)\\(\">\\)\\(\\([^<]\\<[^/]\\</[^A]\\</A[^>]
\\)*\\)\\(</A>\\)" nil t)
        (let ((link (match-string 2))
(linked-text (match-string 4)))
           (replace-match "" t nil)
           (let ((pnt (point))) (insert-string linked-text)
(put-text-property pnt (point) 'face 'underline)
(put-text-property pnt (point) 'WebEditor 'link)))))
(defun
WebEditor2html ( ) (interactive)
     (goto-char 1)
     (while
(next-single-property-change (point) 'WebEditor)
        (if (null
(get-text-property (point) 'WebEditor))
            (goto-char
(next-single-property-change
              (point) 'WebEditor)))
        (insert (concat
"<A HREF=\"file:"
                         (get-text-property (point) 'WebEditor)
                         "\">"))
        (goto-char
           (if
(next-single-property-change (point) 'WebEditor)
(next-single-property-change (point) 'WebEditor)
            (point-max)))
(insert "</A>")))
(defun load-WebEditor (file)
     (find-file-other-window
file)
     (html2WebEditor))
(defun save-WebEditor ( ) (interactive)
(save-excursion
     (WebEditor2html)
     (save-buffer)
(html2WebEditor)))
;;;; Defining a function called, "bmember", that takes two arguments, "x"
;;;; (some buffer), and "1" (the buffer list). This establishes whether
;;;; a given buffer is indeed in the list of recently viewed buffers.
(defun bmember (x 1)
    ;;The following "cond" sets up a conditional command.
    (cond                   ;IF . . .
       ((null 1) nil)        ; . . . the buffer list is "null",THEN return "nil"
                              ; (this is the base case) . . .
       ((equal x (buffer-name (car 1))) t)     ; . . . or, IF the buffer in
                                                ;question matches the first item
                                                ;of the buffer list, then return,
                                                ;yes, it is true that the buffer
                                                ;is a member of the buffer list.
       (t (bmember x (cdr 1)))))      ;SHOULD OTHERWISE PROVE TO BE THE CASE,
                                       ;(i.e., IF that buffer doesn't match the
                                       ;first one in the buffer list), THEN take the
                                       ;same list, minus its first element.
                                       ;Perform the previous two steps of the cond
                                       ;clause recursively on that list.
;;;; This function is used to establish whether a given buffer, named
;;;; "time", exists as a member of a current buffer list.
(defun exists-buffer (time)        ;defining a function called "exists-buffer",
                                    ;that takes one argument, a "time".
     (bmember
time (buffer-list)))         ;determines whether that buffer named,
                              ;"time", exists as a member of the buffer
                              ;list, using the "bmember" function
                              ;commented above.
;;;; This performs the opposite of the function, "bury-buffer" (which
;;;; places the current buffer at the end of the buffer list,
;;;; thus making the next buffer current). "exhume-buffer" takes the
;;;; last member of the buffer list and makes it the current buffer.
(exhume-buffer ( ) (interactive)
     (switch-to-buffer
(car (last (buffer-list)))))
```

What is claimed is:

1. A computer-implemented method for automatically creating linked computer context, comprising:
   a) removing user-selected content from a parent context;
   b) creating and automatically naming a new context comprising said user-selected content; and
   c) inserting a reference to said new context in said parent context, wherein said reference comprises a uniquely identifying function of a name of said new context,
wherein said reference is inserted in the place of said removed user-selected content, and wherein the method is used for purposes comprising web authoring, hypertext editing, and weblogging.

2. The method of claim 1, wherein said parent context and said new context are selected from the group consisting of files, web pages, windows, frames, buffers, and sticky notes; or wherein said name comprises a uniquely identifying function of a timestamp at which said new context creation occurs; or wherein said reference is a hyperlink.

* * * * *